(12) United States Patent
Larson et al.

(10) Patent No.: US 11,174,917 B2
(45) Date of Patent: Nov. 16, 2021

(54) SYSTEMS AND METHODS FOR COMPACT GEAR REDUCTION WITH ANTI-BACKLASH GEARING

(71) Applicant: HONEYWELL INTERNATIONAL INC., Morris Plains, NJ (US)

(72) Inventors: Keith D. Larson, Petosky, MI (US); John Jerred, East Jordan, MI (US); Stephen William Tillotson, Petosky, MI (US); Chandra Sudhakar Gudimetla, Bangalore (IN); Mahesh Basavantappa Hallikeri, Bangalore (IN); Joe Walling, Boyne City, MI (US)

(73) Assignee: Honeywell International Inc., Morris Plains, NJ (US)

( * ) Notice: Subject to any disclaimer, the term of this patent is extended or adjusted under 35 U.S.C. 154(b) by 100 days.

(21) Appl. No.: 16/806,117

(22) Filed: Mar. 2, 2020

(65) Prior Publication Data
US 2020/0278010 A1   Sep. 3, 2020

(30) Foreign Application Priority Data
Mar. 1, 2019   (IN) .............................. 201911008078

(51) Int. Cl.
*F16H 1/28*    (2006.01)
*F16H 57/02*   (2012.01)

(52) U.S. Cl.
CPC .  *F16H 1/2863* (2013.01); *F16H 2057/02073* (2013.01)

(58) Field of Classification Search
CPC ......... F16H 1/2863; F16H 2057/02073; F16H 57/12; F16H 55/18
See application file for complete search history.

(56) References Cited

U.S. PATENT DOCUMENTS

| 1,987,674 A | * | 1/1935 | Ford | F16H 48/11 475/252 |
| 4,524,643 A | * | 6/1985 | Ziegler | F16H 1/2836 475/345 |

(Continued)

FOREIGN PATENT DOCUMENTS

| CN | 105333122 A | 2/2016 | |
| DE | 19712516 A1 * | 10/1998 | F16H 1/2863 |

(Continued)

OTHER PUBLICATIONS

Extended European Search Report for European Patent Application No. 20160283.6, dated Apr. 21, 2020, 2 pages.

*Primary Examiner* — Thomas C Diaz

(74) *Attorney, Agent, or Firm* — Alston & Bird LLP

(57) ABSTRACT

Example systems, apparatuses and methods are disclosed for gear reduction. An example system comprises a second gear configured to be disposed in mesh with a first gear coupled to an input shaft. The system further comprises a carrier housing configured to be fixably disposed within the second gear. The system further comprises a third gear configured to be disposed within the carrier housing; a fourth gear configured to be disposed in mesh with the third gear, wherein the third gear is further configured to rotate about the fourth gear; an anti-backlash gear coupled to the fourth gear and configured to be disposed in mesh with the third gear; and a fifth gear configured to be disposed in mesh with the third gear. The second gear, the fourth gear, the anti-backlash gear, and the fifth gear are configured to be disposed along a common axis of rotation.

20 Claims, 14 Drawing Sheets

(56) References Cited

U.S. PATENT DOCUMENTS 5,540,630 A * 7/1996 Vranish ................ F16H 1/2863
475/338
2004/0089089 A1   5/2004 Stevens et al.

FOREIGN PATENT DOCUMENTS

EP         2103519  A1   9/2009
EP         3101313  A1   12/2016

* cited by examiner

SYSTEMS AND METHODS FOR COMPACT GEAR REDUCTION WITH ANTI-BACKLASH GEARING

CROSS-REFERENCE TO RELATED APPLICATIONS

This application claims the benefit of Indian Patent Application No. IN 201911008078 filed on Mar. 1, 2019, the disclosure of which is herein incorporated by reference in its entirety.

TECHNOLOGICAL FIELD

Example embodiments of the present disclosure relate generally to gear reduction and, more particularly, to epicyclic gear reduction systems with anti-backlash gearing.

BACKGROUND

Industrial and commercial applications, including aerospace applications, are increasingly using measuring devices, such as rotary position sensing devices, that utilize gear reduction systems. These gear reduction systems must fit in ever decreasing package sizes while also reducing cost and weight without sacrificing accuracy, quality or safety.

Applicant has identified a number of deficiencies and problems associated with conventional gear reduction systems. Through applied effort, ingenuity, and innovation, many of these identified problems have been solved by developing solutions that are included in embodiments of the present disclosure, many examples of which are described in detail herein.

SUMMARY

Systems, apparatuses, and methods (including, but not limited to methods of manufacturing) are disclosed herein for providing dual stage, single plane, epicyclic gear reduction. In some embodiments, systems, apparatuses, and methods are further disclosed herein for providing compact anti-backlash gearing.

In one example embodiment, a system is provided for gear reduction. The system may comprise a second gear configured to be disposed in mesh with a first gear coupled to an input shaft. The system may further comprise a carrier housing configured to be fixably disposed within the second gear. The system may further comprise a third gear configured to be disposed within the carrier housing. The system may further comprise a fourth gear configured to be disposed in mesh with the third gear. The third gear may be further configured to rotate about the fourth gear. The system may further comprise an anti-backlash gear coupled to the fourth gear and configured to be disposed in mesh with the third gear. The system may further comprise a fifth gear configured to be disposed in mesh with the third gear. The second gear, the fourth gear, the anti-backlash gear, and the fifth gear may be configured to be disposed along a common axis of rotation. The second gear, the third gear, the fourth gear, the anti-backlash gear, and the fifth gear may be configured to be disposed along a common gear interaction plane.

In another example embodiment, an apparatus is provided for gear reduction. The apparatus may comprise a second gear configured to be disposed in mesh with a first gear coupled to an input shaft. The apparatus may further comprise a carrier housing configured to be fixably disposed within the second gear. The apparatus may further comprise a third gear configured to be disposed within the carrier housing. The apparatus may further comprise a fourth gear configured to be disposed in mesh with the third gear. The third gear may be further configured to rotate about the fourth gear. The apparatus may further comprise an anti-backlash gear coupled to the fourth gear and configured to be disposed in mesh with the third gear. The apparatus may further comprise a fifth gear configured to be disposed in mesh with the third gear. The second gear, the fourth gear, the anti-backlash gear, and the fifth gear may be configured to be disposed along a common axis of rotation. The second gear, the third gear, the fourth gear, the anti-backlash gear, and the fifth gear may be configured to be disposed along a common gear interaction plane.

In another example embodiment, a method is provided for manufacturing an apparatus for gear reduction. The method may comprise providing a first gear. The first gear may be coupled to an input shaft. The method may further comprise mounting a second gear to the first gear. The second gear is in mesh with the first gear. The method may further comprise mounting a carrier housing within the second gear. The method may further comprise mounting a third gear within the carrier housing. The method may further comprise mounting a fourth gear to the third gear. The fourth gear may be in mesh with the third gear. The third gear may be rotatable about the fourth gear. The method may further comprise mounting an anti-backlash gear to the third gear. The anti-backlash gear may be coupled to the fourth gear and in mesh with the third gear. The method may further comprise mounting a fifth gear to the third gear. The fifth gear may be in mesh with the third gear. The second gear, the fourth gear, the anti-backlash gear, and the fifth gear may be disposed along a common axis of rotation. The first gear, the second gear, the third gear, the fourth gear, the anti-backlash gear, and the fifth gear may be disposed along a common gear interaction plane.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those summarized above, some of which will be further described below.

BRIEF DESCRIPTION OF THE DRAWINGS

Having described certain example embodiments of the present disclosure in general terms above, reference will now be made to the accompanying drawings, which illustrate example embodiments and features of the present disclosure and are not necessarily drawn to scale. It will be understood that the components and structures illustrated in the drawings may or may not be present in various embodiments of the disclosure described herein. Accordingly, some embodiments or features of the present disclosure may include fewer or more components or structures than those shown in the drawings while not departing from the scope of the disclosure.

DETAILED DESCRIPTION

Figure 1A:
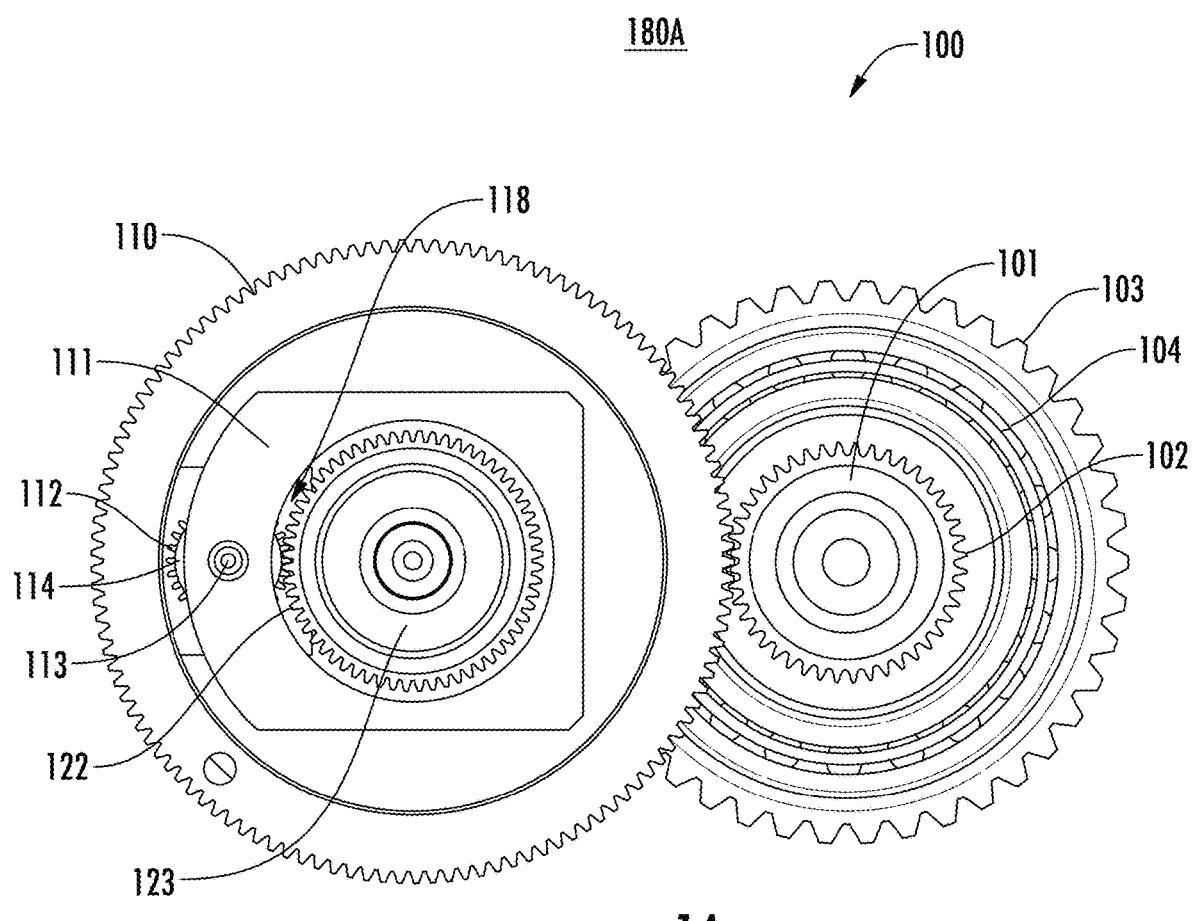
FIGS. 1A, 1B, 1C, 1D, and 1E illustrate example top and isometric views of an example gear reduction system in accordance with some example embodiments described herein.

The following description should be read with reference to the drawings wherein like reference numerals indicate like elements throughout the several views. The detailed description and drawings show several embodiments which are meant to be illustrative of the disclosure. It should be understood that any numbering of disclosed features (e.g., first, second, etc.) and directional terms used in conjunction with disclosed features (e.g., front, back, top, bottom, side, and the like) are relative terms indicating illustrative relationships between the pertinent features.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale. The word "example," when used herein, is intended to mean "serving as an example, instance, or illustration." Any implementation described herein as an "example" is not necessarily preferred or advantageous over other implementations.

Typically, when a position sensor with high accuracy and high gear amplification and reduction within a compact size is required, the common practice is to use multi-stage gear trains (e.g., a combination of a planetary gear train and simple gear trains) to achieve the required gear ratio. However, traditional gear train designs may not be capable of accommodating these requirements within a defined envelope. Accordingly, there exists a need for compact, highly accurate gear reduction systems which may use reductions of two stages or more for use in sensitive measuring devices such as rotary position sensors. These gear systems need to fit in ever decreasing package sizes while also reducing cost and weight without sacrificing accuracy, quality, or safety. However, typical dual stage gear reduction systems have three axes and dual planes and thus are too big (e.g., their package sizes exceed design requirements) and costly for many modern applications.

Example embodiments described herein solve these requirements by describing unique designs for dual stage, dual axes, single plane, epicyclic gear reduction systems with compact anti-backlash gearing. The gear reduction systems disclosed herein utilize a first gear to drive a modified epicyclic gear train layout to reduce the typical three axes layout into an improved dual axes layout. As a result of this reduction in required axes, the disclosed gear reduction systems further reduce the typical dual plane layout into an improved single plane layout. The combination of dual axes and single plane layouts provides for highly accurate, compact gear reduction systems as a result of the reduction of required parts, axes, and gear interfacing planes. The gear reduction systems disclosed herein provide an engineering design advantage in minimizing the amount of space required while achieving higher gear reductions and minimizing cost without additional envelope.

Example embodiments described herein provide systems, apparatuses, and methods for gear reduction systems that provide compact gear reduction with anti-backlash gearing. In some embodiments, an input shaft with a drive gear transmits rotary motion from an input interface (e.g., axis #1). A pinion gear interface (e.g., axis #2) defines the first gear stage reduction. This pinion gear is an integral part of a subassembly which combines an inline modified epicyclic gear train consisting of a carrier housing with a shaft and an idler gear which interfaces the inline modified epicyclic gear train. The inline modified epicyclic gear train comprises one stationary (e.g., fixed) modified gear and one opposing gear which interfaces with the idler gear and defines the second stage reduction along this same axis (e.g., axis #2). The stationary modified gear has one tooth less than the opposing gear. An output drive gear is added to control multiple output devices, such as two sensing devices (e.g., rotary position sensing devices, resolvers, synchros). These output devices may be mounted with input pinion gears, which defines the third axis (e.g., axis #3). All three gear center axes may be defined by desired gear center distance calculations and recommendations.

As the input shaft drive gear (e.g., gear #1) rotates about the first axis (e.g., axis #1), it transmits rotary motion to the interfacing gear (e.g., gear #2) on the second axis (e.g., axis #2) which defines the first stage. The interfacing gear (e.g., gear #2) is attached to the carrier housing and the idler gear (e.g., gear #3) which rotates about the modified stationary gear (e.g., gear #4). The opposing gear (e.g., gear #5) of the stationary gear (e.g., gear #4) is indexed 1 tooth per revolution of the carrier housing which defines the second stage reduction. The output pinion gear (e.g., gear #6), affixed to the opposing gear (e.g., gear #5), rotates about the second axis (e.g., axis #2) and defines the second gear interaction plane. As the final pinion (e.g., gear #6) rotates, the final gear (e.g., gear #7) rotates about the third axis (e.g., axis #3) and moves the sensing device. The gear reduction systems disclosed herein may be utilized with any additional standard gear layouts (e.g., cascade gearing) to achieve reductions in excess of 10,000:1.

In addition, to meet accuracy requirements, an anti-backlash mechanism may be utilized to reduce the lost motion in the gear train which ordinarily results from the tooth clearances in the gear mesh. The lost motion commonly presents itself when the direction of gear train rotation is reversed. Although multiple techniques may be used to achieve low backlash, the embodiments described herein use anti-backlash gears. Generally, traditional gear reduction systems use an anti-backlash mechanism at the last stage of the gear train (e.g., a simple gear train) which drives the sensing device (e.g., resolver, synchro) to meet the accuracy requirements. However, when accuracy requirements are tighter, it is required to eliminate or reduce the wobble or eccentricity at all stages and provide additional anti-backlash mechanisms other than at the last stage, such as on the planetary gear mechanism because higher gear reduction and amplification happens at this stage and many unforeseen variables (e.g., design and process variations) at this stage contribute to significant reduction in accuracy. However, it is quite difficult to provide an anti-backlash mechanism (e.g., an anti-backlash gear) at the planetary gear train due to envelope constraints. As a result, traditional sensors do not contain an independent anti-backlash mechanism for a planetary gear mechanism, especially when parallel axes and multi-stage gear trains are used.

Example embodiments described herein with reference to FIGS. 3A and 3B solve these requirements by using a single gear shaft 320 supported at its ends instead of two independent components (e.g., a carrier shaft 220 and an intermediate shaft 223 as described with reference to FIGS. 2A and 2B) and supporting the carrier subassembly externally by higher load rating bearings (e.g., ball bearing 319, ball bearing 321). This design allows the gear reduction system to include an anti-backlash mechanism (e.g., anti-backlash spring 332 and anti-backlash gear 333) for the planetary gear mechanism that, in combination with the higher load rating bearings, provides an increased margin of safety with respect to life and load requirements. Thus, the example embodiments described herein provide systems, apparatuses, and methods for gear reduction systems that provide compact, high reliability, and comparatively cost effective (e.g., relatively low cost) methods of providing an independent anti-backlash mechanism for a planetary gear mechanism when parallel axes and multi-stage gear trains are used and making the gear train mechanism more robust to improve accuracy significantly. The example embodiments described herein further provide tighter accuracy requirements without seeking deviation to allow the usage of a hair-spring and envelope change. The example embodiments described herein further improve the robustness of the mounting of gear trains in order to meet product life requirements, especially when a position sensor is required for high-speed rotational applications with higher equipment life requirements.

In some embodiments, the gear reduction systems described herein comprise the combination of a high-reduction epicyclic gear stage and an added anti-backlash gear pair. The reduction is based on having an output gear with N teeth (e.g., the second gear 110, 210, 310), and a fixed gear (e.g., the fourth gear 117, 217, 317) with N−1 teeth and which has a non-standard pitch diameter modified to be equal to the output gear (e.g., the fifth gear 122, 222, 322), where the output gear has N teeth, and where N is an integer greater than or equal to two. A planet gear (e.g., the third gear 112, 212, 312) orbits the fixed gear and the output gear and meshes with both. As the planet gear orbits, it forces the teeth of both the fixed gear and the output gear to be aligned at the mesh point. Due to the mismatch in number of teeth, the output gear is incremented one tooth relative to the fixed gear for every orbit of the planet gear. The input to this gear stage is the rotation of the planetary carrier (e.g., carrier housing 111, 211, 311).

Although the disclosure describes the features of the gear reduction systems with reference to an input shaft and a sensing device, the gear reduction systems disclosed herein may be applied in any suitable mechanical system, electromechanical system, sensor, detector, gauge, instrument, or application where maximized gear reduction and accuracy with minimized package size and cost is desired.

FIG. 1A illustrates an example top view 180A of an example gear reduction system 100 in accordance with some example embodiments described herein. In some embodiments, the gear reduction system 100 may be a dual stage, dual axes, single plane, epicyclic gear reduction system with compact anti-backlash gearing. In some embodiments, the gear reduction system 100 may comprise, or be referred to as, a gear train. In some embodiments, a maximum diameter of the gear reduction system 100 is less than about two inches.

As shown in FIG. 1A, the example gear reduction system 100 may comprise a first gear 102 coupled to an input shaft 101. In some embodiments, the first gear 102 may be an input shaft drive gear. The input shaft 101 may be further coupled to a gear 103 and a ball bearing 104. The first gear 102 and the gear 103 may be integral to the input shaft 101. The example gear reduction system 100 may further comprise a second gear 110 configured to be disposed in mesh with the first gear 102. In some embodiments, the second gear 110 may be a sun gear. The example gear reduction system 100 may further comprise a carrier housing 111 configured to be fixably disposed (e.g., welded; affixed using an adhesive, a set of fasteners (e.g., screws, retaining pins, bolts), or both; fabricated (e.g., cast, machined, printed) as a single component; or affixed using any other suitable technique) within the second gear 110. The example gear reduction system 100 may further comprise a third gear 112 configured to be disposed within the carrier housing 111. In some embodiments, the third gear 112 may be an planet gear, an idler gear, or both. The third gear 112 may be mounted to the carrier housing 111 using a retaining pin 113 and one or more ball bearings, such as a ball bearing 114. The example gear reduction system 100 may further comprise a fixed structure 118, which may be partially visible in the example top view 180A. The example gear reduction system 100 may further comprise a fifth gear 122 coupled to an intermediate shaft 123 and configured to be disposed in mesh with the third gear 112. The fifth gear 122 may be integral to the intermediate shaft 123. In some embodiments, the fifth gear 122 may be an opposing gear of the fourth gear 117.

Figure 1B:
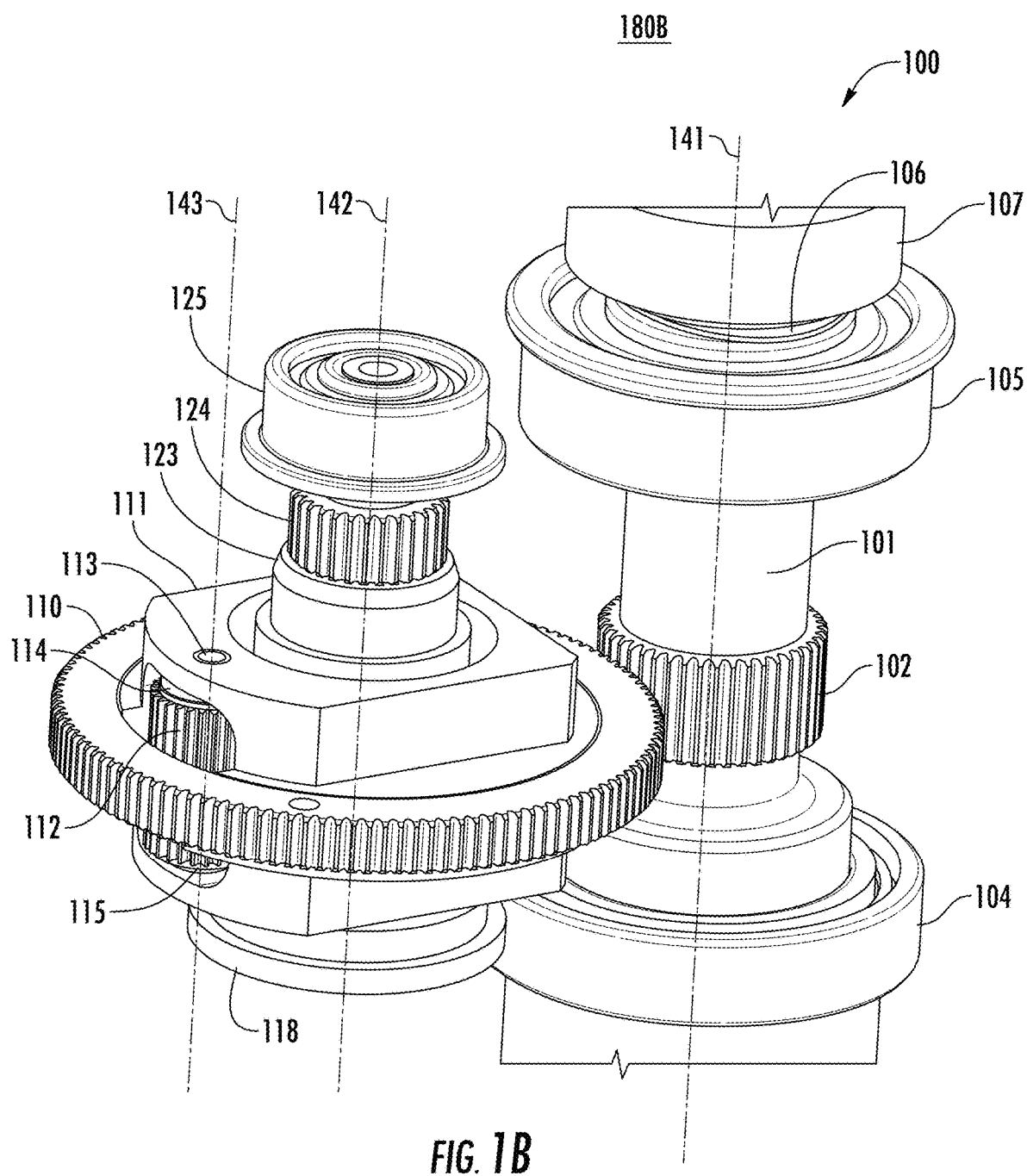

FIG. 1B illustrates an example isometric view 180B of the example gear reduction system 100 in accordance with some example embodiments described herein. As shown in FIG. 1B, the example gear reduction system 100 may comprise the first gear 102 coupled to the input shaft 101. The input shaft 101 may be further coupled to the ball bearing 104, a ball bearing 105 and a support structure 107. A wave spring 106 may be disposed between the ball bearing 105 and the support structure 107 for preloading the ball bearing 105. The example gear reduction system 100 may further comprise the second gear 110 configured to be disposed in mesh with the first gear 102. The example gear reduction system 100 may further comprise the carrier housing 111 configured to be fixably disposed within the second gear 110. The example gear reduction system 100 may further comprise the third gear 112 configured to be disposed within the carrier housing 111. The third gear 112 may be mounted to the carrier housing 111 using the retaining pin 113, the ball bearing 114, and a ball bearing 115. The example gear reduction system 100 may further comprise the fifth gear 122 coupled to the intermediate shaft 123 and configured to be disposed in mesh with the third gear 112. The example gear reduction system 100 may further comprise a sixth gear 124 coupled to the intermediate shaft 123. In some embodiments, the sixth gear 124 may be an output pinion gear. The sixth gear 124 may be coupled to the fifth gear 122 via the intermediate shaft 123. The example gear reduction system 100 may further comprise a ball bearing 125 coupled to the intermediate shaft 123.

Figure 1C:
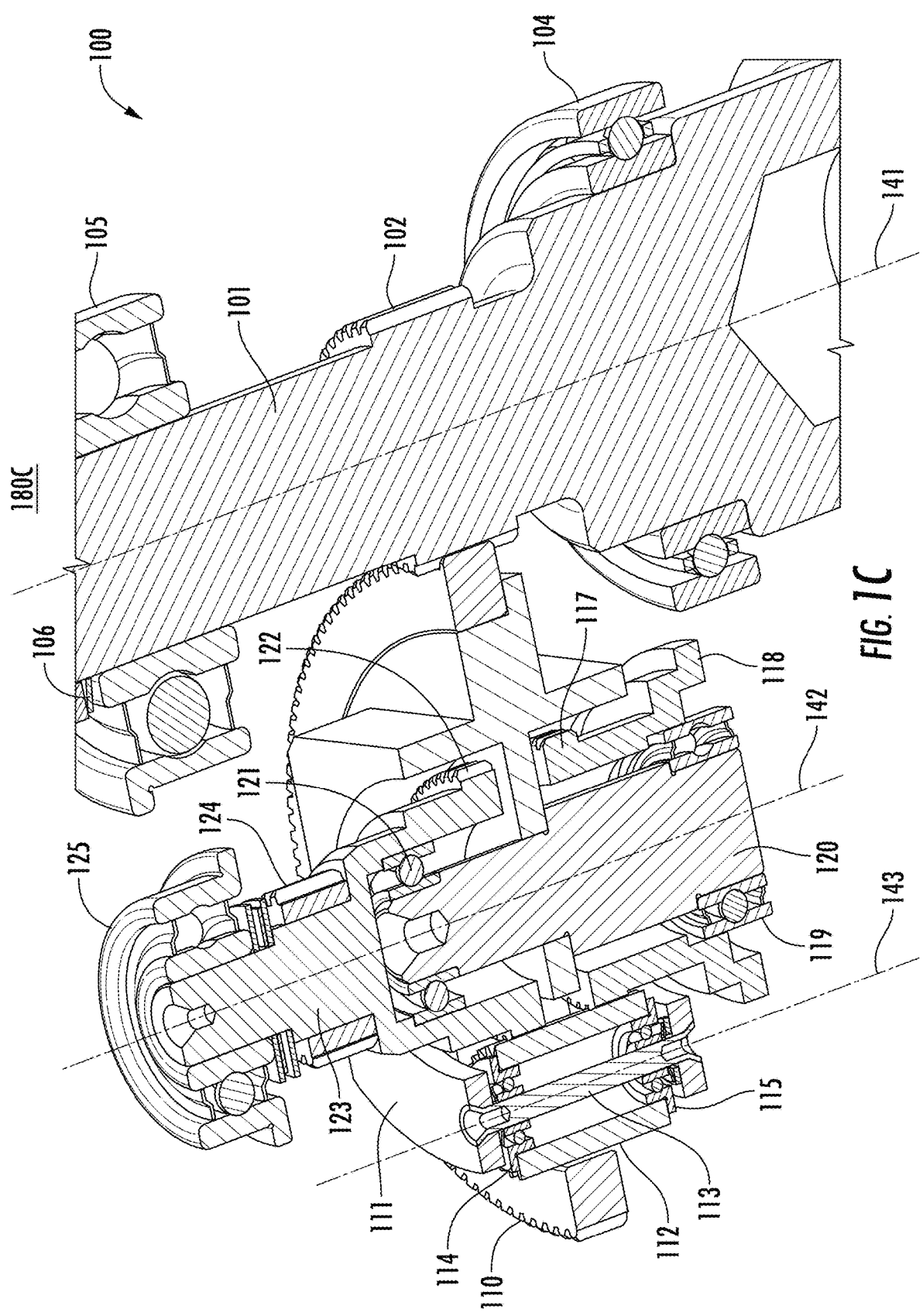

FIG. 1C illustrates an example cross-sectional isometric view 180C of the example gear reduction system 100 in accordance with some example embodiments described herein. As shown in FIG. 1C, the example gear reduction system 100 may comprise the first gear 102 coupled to the input shaft 101. The input shaft 101 may be further coupled to the ball bearing 104 and the ball bearing 105. The wave spring 106 may be disposed on the ball bearing 105 for preloading the ball bearing 105. The example gear reduction system 100 may further comprise the second gear 110 configured to be disposed in mesh with the first gear 102. The example gear reduction system 100 may further comprise the carrier housing 111 configured to be fixably disposed within the second gear 110. The example gear reduction system 100 may further comprise the third gear 112 configured to be disposed within the carrier housing 111. The third gear 112 may be mounted to the carrier housing 111 using the retaining pin 113, the ball bearing 114, and the ball bearing 115. A wave spring may preload the ball bearing 114 and may be disposed between the ball bearing 114 and the carrier housing 111. Another wave spring may preload the ball bearing 115 and may be disposed between the ball bearing 115 and the carrier housing 111. The example gear reduction system 100 may further comprise the fixed structure 118. The example gear reduction system 100 may further comprise a fourth gear 117 coupled to the fixed structure 118 and configured to be disposed in mesh with the third gear 112. The third gear 112 may be further configured to rotate about the fourth gear 117. In some embodiments, the fourth gear 117 may be a stationary gear. In some embodiments, the fourth gear 117 may have one less tooth than the fifth gear 122. The example gear reduction system 100 may further comprise a carrier shaft 120. The example gear reduction system 100 may further comprise a ball bearing 119 coupled to the carrier shaft 120. The example gear reduction system 100 may further comprise a ball bearing 121 coupled to the carrier shaft 120. The example gear reduction system 100 may further comprise the fifth gear 122 coupled to the intermediate shaft 123 and configured to be disposed in mesh with the third gear 112. The intermediate shaft 123 may be coupled to the ball bearing 121. The example gear reduction system 100 may further comprise the sixth gear 124 coupled to the intermediate shaft 123. The sixth gear 124 may be coupled to the fifth gear 122 via the intermediate shaft 123. The example gear reduction system 100 may further comprise the ball bearing 125 coupled to the intermediate shaft 123.

Figure 1D:
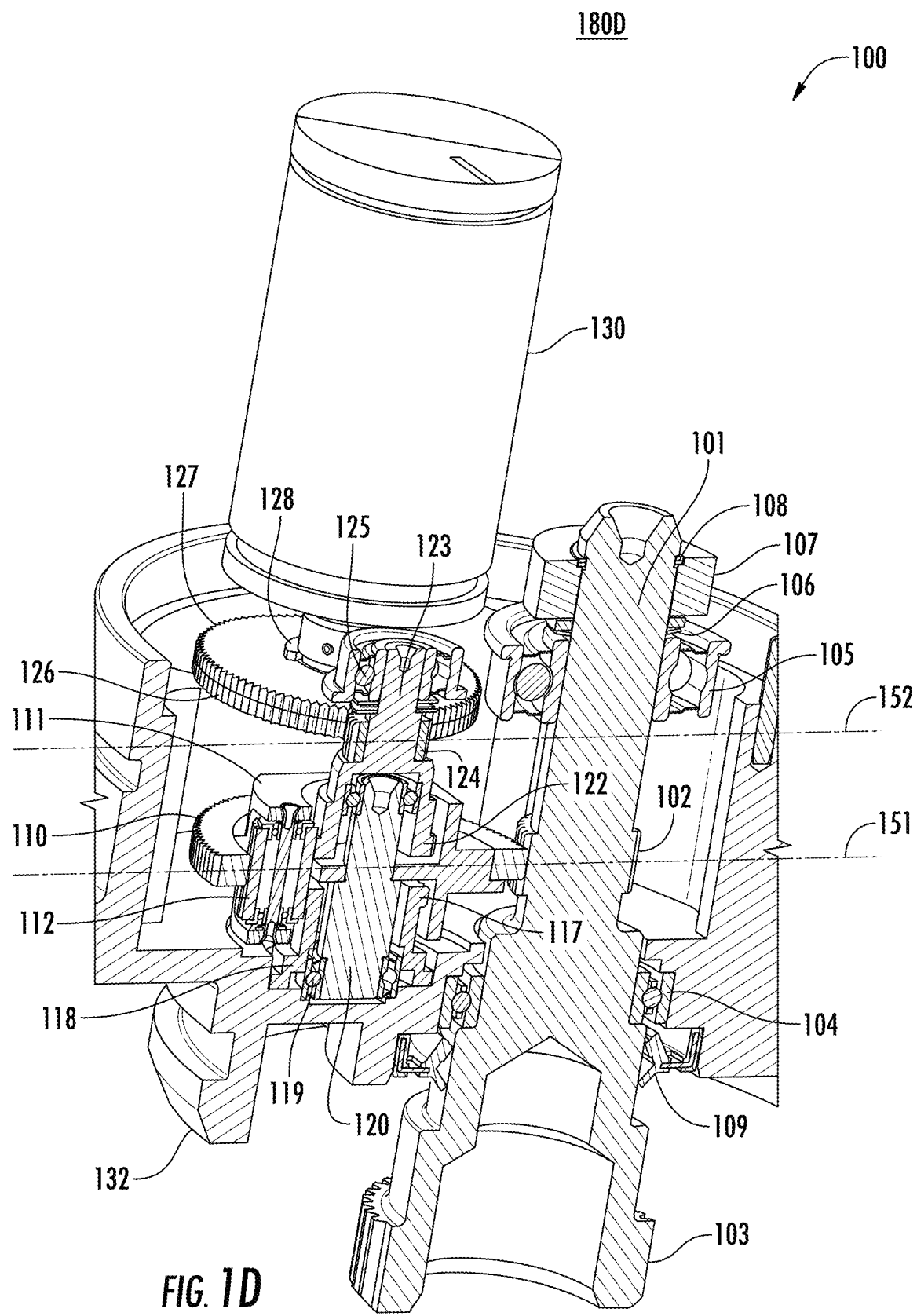

FIG. 1D illustrates an example cross-sectional isometric view 180D of the example gear reduction system 100 in accordance with some example embodiments described herein. As shown in FIG. 1D, the example gear reduction system 100 may comprise the first gear 102 coupled to the input shaft 101. The input shaft 101 may be further coupled to the ball bearing 104 and the ball bearing 105. The wave spring 106 may be disposed on the ball bearing 105 for preloading the ball bearing 105. A retaining ring 108 may couple the support structure 107 to the input shaft 101. The ball bearing 104 and a retaining structure 109 may couple the input shaft 101 to a frame 132. The example gear reduction system 100 may further comprise the second gear 110 configured to be disposed in mesh with the first gear 102. The example gear reduction system 100 may further comprise the carrier housing 111 configured to be fixably disposed within the second gear 110. The example gear reduction system 100 may further comprise the third gear 112 configured to be disposed within the carrier housing 111. The example gear reduction system 100 may further comprise the fourth gear 117 coupled to the fixed structure 118 and configured to be disposed in mesh with the third gear 112. The fourth gear 117 may be integral to the fixed structure 118. The fixed structure 118 may be fixably disposed (e.g., affixed using a set of fasteners (e.g., screws, retaining pins, bolts), an adhesive, or both; welded; or affixed using any other suitable technique) to the frame 132. The third gear 112 may be further configured to rotate about the fourth gear 117. The example gear reduction system 100 may further comprise the carrier shaft 120. The ball bearing 119 may be coupled to the frame 132, the carrier shaft 120, and the fixed structure 118. The example gear reduction system 100 may further comprise the fifth gear 122 coupled to the intermediate shaft 123 and configured to be disposed in mesh with the third gear 112. The example gear reduction system 100 may further comprise the sixth gear 124 coupled to the intermediate shaft 123. The sixth gear 124 may be coupled to the fifth gear 122 via the intermediate shaft 123. The example gear reduction system 100 may further comprise the ball bearing 125 coupled to the intermediate shaft 123. The example gear reduction system 100 may further comprise a seventh gear 126 coupled to a sensing device 130 by a retaining ring 128. In some embodiments, the sensing device 130 may be a rotary position sensing device. The sixth gear 124 may be configured to be disposed in mesh with the seventh gear 126. The example gear reduction system 100 may further comprise an anti-backlash gear 127 coupled to the seventh gear 126 by a torsion spring and the retaining ring 128. The anti-backlash gear 127 may be configured to be disposed in mesh with the sixth gear 124 to provide for compact anti-backlash gearing.

Figure 1E:
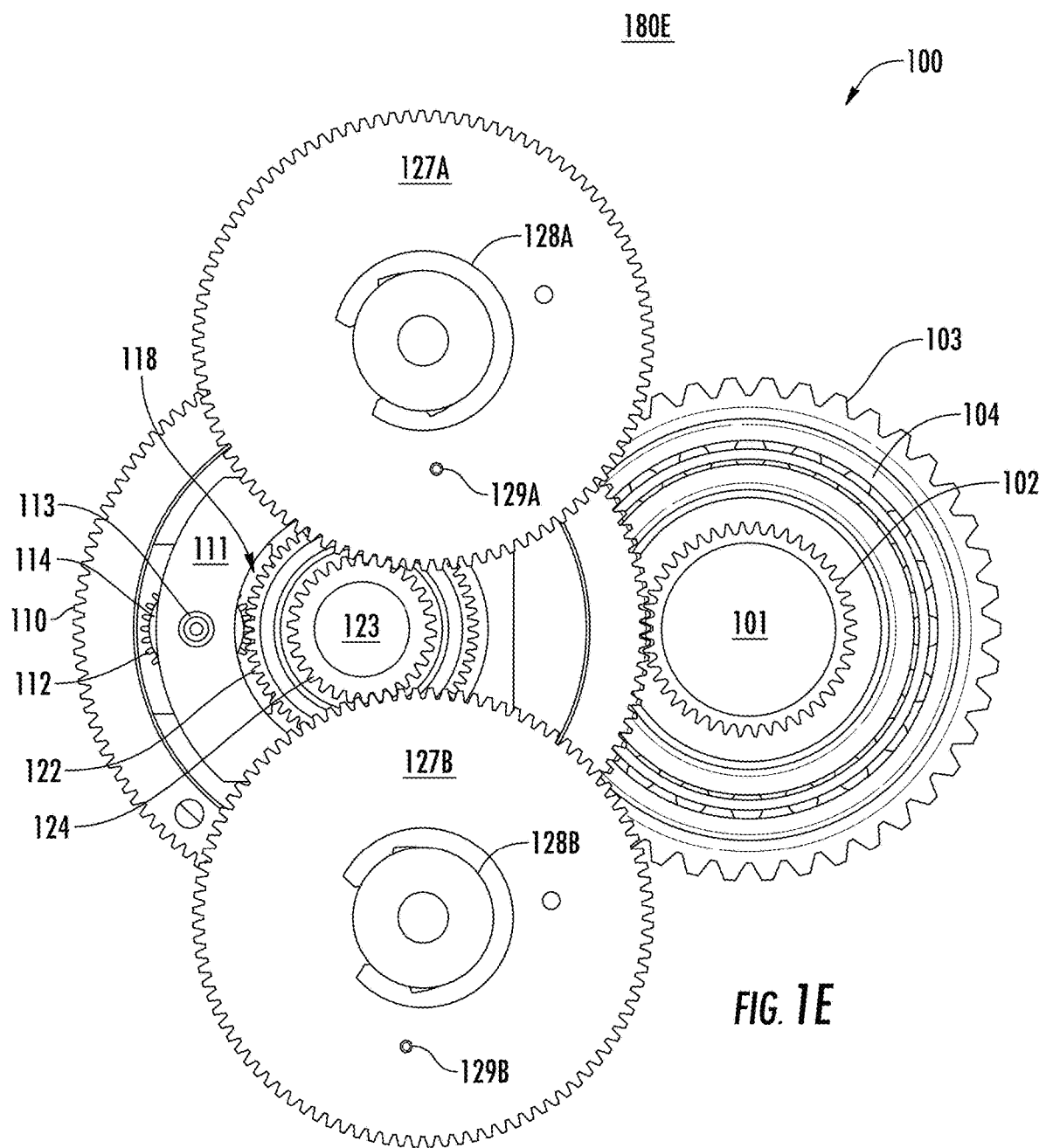

FIG. 1E illustrates an example top view 180E of the example gear reduction system 100 in accordance with some example embodiments described herein. As shown in FIG. 1E, the example gear reduction system 100 may comprise the first gear 102 coupled to the input shaft 101. The input shaft 101 may be further coupled to the gear 103 and the ball bearing 104. The example gear reduction system 100 may further comprise the second gear 110 configured to be disposed in mesh with the first gear 102. The example gear reduction system 100 may further comprise the carrier housing 111 configured to be fixably disposed within the second gear 110. The example gear reduction system 100 may further comprise the third gear 112 configured to be disposed within the carrier housing 111. The third gear 112 may be mounted to the carrier housing 111 using the retaining pin 113 and one or more ball bearings, such as the ball bearing 114. The example gear reduction system 100 may further comprise the fixed structure 118, which may be partially visible in the example top view 180E. The example gear reduction system 100 may further comprise the fifth gear 122 coupled to the intermediate shaft 123 and configured to be disposed in mesh with the third gear 112. The example gear reduction system 100 may further comprise the sixth gear 124 coupled to the intermediate shaft 123. The sixth gear 124 may be coupled to the fifth gear 122 via the intermediate shaft 123. The example gear reduction system 100 may further comprise an anti-backlash gear 127A coupled to a seventh gear (e.g., a seventh gear disposed underneath the anti-backlash gear 127A and thus not visible in the example top view 180E) by a torsion spring 129A and a retaining ring 128A. The example gear reduction system 100 may further comprise an anti-backlash gear 127B coupled to a seventh gear (e.g., a seventh gear disposed underneath the anti-backlash gear 127B and thus not visible in the example top view 180E) by a torsion spring 129B and a retaining ring 128B. The anti-backlash gear 127A and the anti-backlash gear 127B may be configured to be disposed in mesh with the sixth gear 124 to provide for compact anti-backlash gearing.

In some embodiments, as shown in FIGS. 1A-1E, the gear reduction system 100 may provide for dual stage gear reduction. For example, the first gear 102 and the second gear 110 may be configured to form a first gear reduction stage. The second gear 110, the third gear 112, the fourth gear 117, the fifth gear 122, and the sixth gear 124 may be configured to form a second gear reduction stage different from the first gear reduction stage. In some embodiments, the sixth gear 124, the seventh gear 126, and the anti-backlash gear 127 may be configured to form a third gear reduction stage different from the first gear reduction stage and the second gear reduction stage.

In some embodiments, as shown in FIGS. 1B and 1C, the gear reduction system 100 may provide for dual axes gear reduction. For example, the first gear 102, the input shaft 101, and the gear 103 may be configured to be disposed along a first axis of rotation 141. The second gear 110, the fourth gear 117, the fifth gear 122, and the sixth gear 124 may be configured to be disposed along a second axis of rotation 142 different from the first axis of rotation 141. In some embodiments, the third gear 112 may be configured to be disposed along a third axis of rotation 143 different from the first axis of rotation 141 and the second axis of rotation 142.

In some embodiments, as shown in FIG. 1D, the gear reduction system 100 may provide for single plane gear reduction. For example, the first gear 102, the second gear 110, the third gear 112, the fourth gear 117, and the fifth gear 122 may be configured to be disposed along a first gear interaction plane 151. In some embodiments, the sixth gear 124, the seventh gear 126, and the anti-backlash gear 127 may be configured to be disposed along a second gear interaction plane 152 different from the first gear interaction plane 151.

Figure 2A:
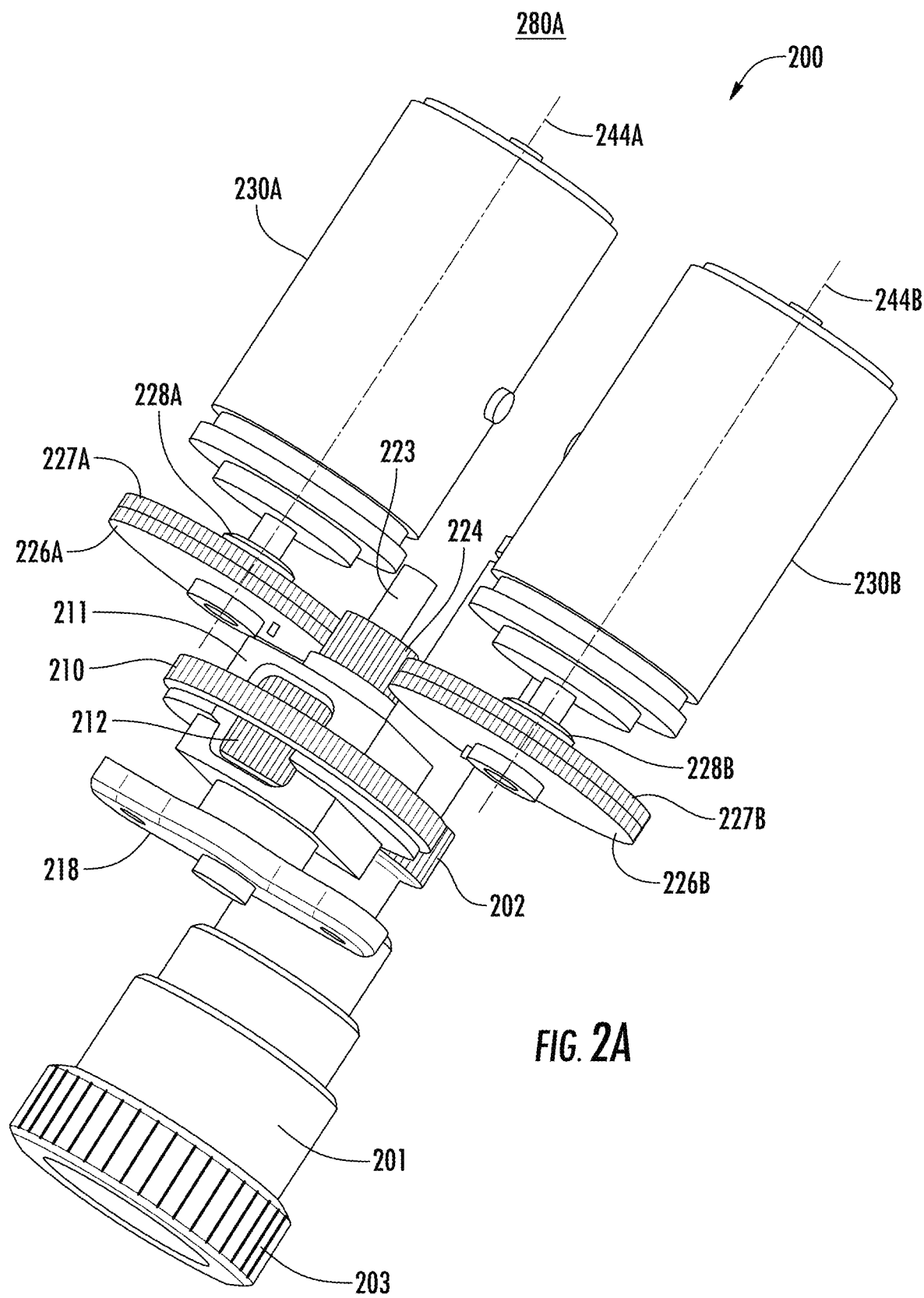
FIGS. 2A and 2B illustrate example isometric views of an example gear reduction system in accordance with some example embodiments described herein.

FIG. 2A illustrates an example isometric view 280A of an example gear reduction system 200 in accordance with some example embodiments described herein. In some embodiments, the gear reduction system 200 may be a dual stage, dual axes, single plane, epicyclic gear reduction system with compact anti-backlash gearing. In some embodiments, the gear reduction system 200 may comprise, or be referred to as, a gear train. In some embodiments, a maximum diameter of the gear reduction system 200 is less than about two inches.

As shown in FIG. 2A, the example gear reduction system 200 may comprise a first gear 202 coupled to an input shaft 201. In some embodiments, the first gear 202 may be an input shaft drive gear. The input shaft 201 may be further coupled to a gear 203. The first gear 202 and the gear 203 may be integral to the input shaft 201. The example gear reduction system 200 may further comprise a second gear 210 configured to be disposed in mesh with the first gear 202. In some embodiments, the second gear 210 may be a sun gear. The example gear reduction system 200 may further comprise a carrier housing 211 configured to be fixably disposed (e.g., welded; affixed using an adhesive, a set of fasteners (e.g., screws, retaining pins, bolts), or both; fabricated (e.g., cast, machined, printed) as a single component; or affixed using any other suitable technique) within the second gear 210. The example gear reduction system 200 may further comprise a third gear 212 configured to be disposed within the carrier housing 211. In some embodiments, the third gear 212 may be an planet gear, an idler gear, or both. The third gear 212 may be mounted to the carrier housing 211 using a retaining pin and one or more ball bearings. The example gear reduction system 200 may further comprise a fixed structure 218. The fixed structure 218 may be fixably disposed (e.g., affixed using a set of fasteners (e.g., screws, retaining pins, bolts), an adhesive, or both; welded; or affixed using any other suitable technique) to a frame or a support structure. The example gear reduction system 200 may further comprise a sixth gear 224 coupled to an intermediate shaft 223. In some embodiments, the sixth gear 224 may be an output pinion gear. The example gear reduction system 200 may further comprise a seventh gear 226A coupled to a sensing device 230A by a retaining ring 228A. In some embodiments, the sensing device 230A may be a first rotary position sensing device. The example gear reduction system 200 may further comprise a seventh gear 226B coupled to a sensing device 230B by a retaining ring 228B. In some embodiments, the sensing device 230B may be a second rotary position sensing device. The sixth gear 224 may be configured to be disposed in mesh with the seventh gear 226A and the seventh gear 226B. The example gear reduction system 200 may further comprise an anti-backlash gear 227A coupled to (e.g., disposed above) the seventh gear 226A by a torsion spring and the retaining ring 228A. The example gear reduction system 200 may further comprise an anti-backlash gear 227B coupled to (e.g., disposed above) the seventh gear 226B by a torsion spring and the retaining ring 228B. The anti-backlash gear 227A and the anti-backlash gear 227B may be configured to be disposed in mesh with the sixth gear 224 to provide for compact anti-backlash gearing.

Figure 2B:
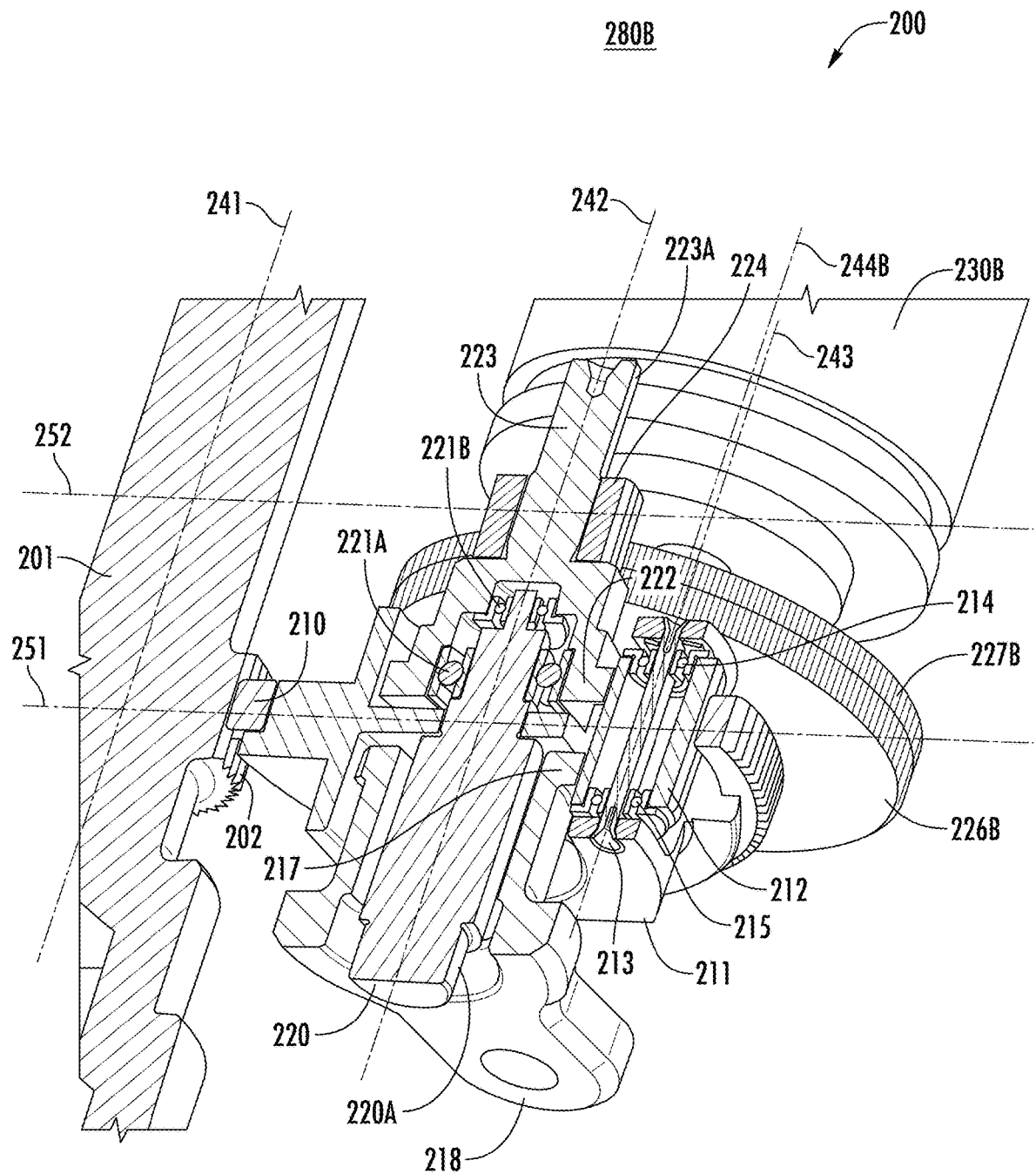

FIG. 2B illustrates an example cross-sectional isometric view 280B of the example gear reduction system 200 in accordance with some example embodiments described herein. As shown in FIG. 2B, the example gear reduction system 200 may comprise the first gear 202 coupled to the input shaft 201. The example gear reduction system 200 may further comprise the second gear 210 configured to be disposed in mesh with the first gear 202. The example gear reduction system 200 may further comprise the carrier housing 211 configured to be fixably disposed within the second gear 210. The example gear reduction system 200 may further comprise the third gear 212 configured to be disposed within the carrier housing 211. The third gear 212 may be mounted to the carrier housing 211 using a retaining pin 213, a ball bearing 214, and a ball bearing 215. A wave spring may preload the ball bearing 214 and may be disposed between the ball bearing 214 and the carrier housing 211. Another wave spring may preload the ball bearing 215 and may be disposed between the ball bearing 215 and the carrier housing 211. The example gear reduction system 200 may further comprise the fixed structure 218. The example gear reduction system 200 may further comprise a fourth gear 217 coupled to the fixed structure 218 and configured to be disposed in mesh with the third gear 212. The fourth gear 217 may be integral to the fixed structure 218. The third gear 212 may be further configured to rotate about the fourth gear 217. In some embodiments, the fourth gear 217 may be a stationary gear. In some embodiments, the fourth gear 217 may have one less tooth than the fifth gear 222. The example gear reduction system 200 may further comprise the carrier shaft 220. The carrier shaft 220 comprises a frame bearing location 220A. The example gear reduction system 200 may further comprise a ball bearing 221A coupled to a first portion of the carrier shaft 220. The example gear reduction system 200 may further comprise a ball bearing 221B coupled to a second portion of the carrier shaft 220. The example gear reduction system 200 may further comprise a fifth gear 222 coupled to the intermediate shaft 223 and configured to be disposed in mesh with the third gear 212. The fifth gear 222 may be integral to the intermediate shaft 223. In some embodiments, the fifth gear 222 may be an opposing gear of the fourth gear 217. A first portion of the intermediate shaft 223 may be coupled to the ball bearing 221A, and a second portion of the intermediate shaft 223 may be coupled to the ball bearing 221B. The intermediate shaft 223 comprises a plate bearing location 223A. The example gear reduction system 200 may further comprise the sixth gear 224 coupled to the intermediate shaft 223. The sixth gear 224 may be coupled to the fifth gear 222 via the intermediate shaft 223. The example gear reduction system 200 may further comprise the seventh gear 226B coupled to the sensing device 230B by a retaining ring. The sixth gear 224 may be configured to be disposed in mesh with the seventh gear 226B. The example gear reduction system 200 may further comprise the anti-backlash gear 227B coupled the seventh gear 226B by a torsion spring and the retaining ring. The anti-backlash gear 227B may be configured to be disposed in mesh with the sixth gear 224 to provide for compact anti-backlash gearing.

In some embodiments, as shown in FIGS. 2A and 2B, the gear reduction system 200 may provide for dual stage gear reduction. For example, the first gear 202 and the second gear 210 may be configured to form a first gear reduction stage. The second gear 210, the third gear 212, the fourth gear 217, the fifth gear 222, and the sixth gear 224 may be configured to form a second gear reduction stage different from the first gear reduction stage. In some embodiments, the sixth gear 224, the seventh gear 226A, the seventh gear 226B, the anti-backlash gear 227A, and the anti-backlash gear 227B may be configured to form a third gear reduction stage different from the first gear reduction stage and the second gear reduction stage.

In some embodiments, as shown in FIGS. 2A and 2B, the gear reduction system 200 may provide for dual axes gear reduction. For example, the first gear 202, the input shaft 201, and the gear 203 may be configured to be disposed along a first axis of rotation 241. The second gear 210, the fourth gear 217, the fifth gear 222, and the sixth gear 224 may be configured to be disposed along a second axis of rotation 242 different from the first axis of rotation 241. In some embodiments, the third gear 212 may be configured to be disposed along a third axis of rotation 243 different from the first axis of rotation 241 and the second axis of rotation 242. In some embodiments, the seventh gear 226A, the anti-backlash gear 227A, and the sensing device 230A may be configured to be disposed along a fourth axis of rotation 244A different from the first axis of rotation 241, the second axis of rotation 242, and the third axis of rotation 243. In some embodiments, the seventh gear 226B, the anti-backlash gear 227B, and the sensing device 230B may be configured to be disposed along a fifth axis of rotation 244B different from the first axis of rotation 241, the second axis of rotation 242, the third axis of rotation 243, and the fourth axis of rotation 244A.

In some embodiments, as shown in FIG. 2B, the gear reduction system 200 may provide for single plane gear reduction. For example, the first gear 202, the second gear 210, the third gear 212, the fourth gear 217, and the fifth gear 222 may be configured to be disposed along a first gear interaction plane 251. In some embodiments, the sixth gear 224, the seventh gear 226A, the seventh gear 226B, the anti-backlash gear 227A, and the anti-backlash gear 227B may be configured to be disposed along a second gear interaction plane 252 different from the first gear interaction plane 251.

Figure 3A:
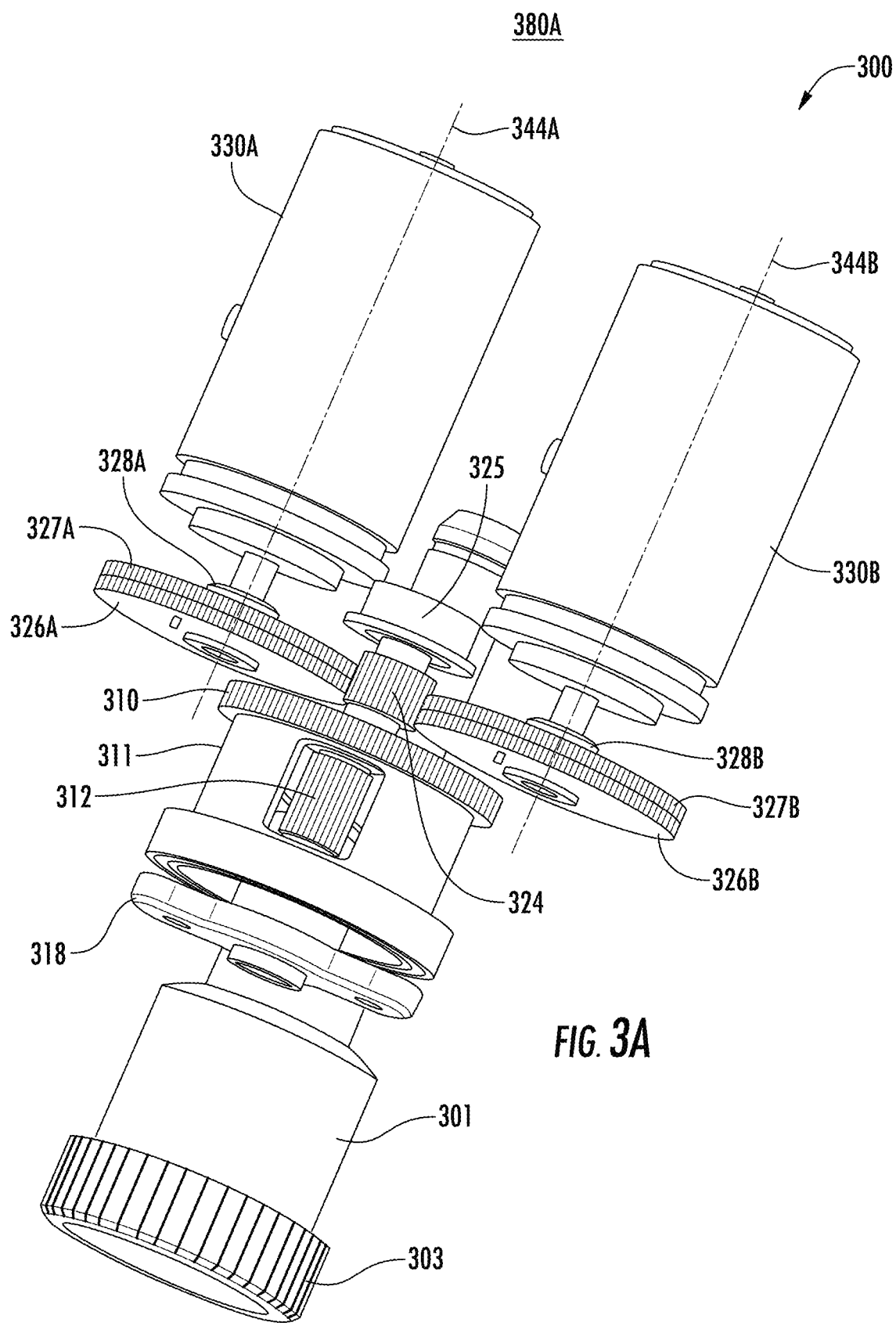
FIGS. 3A and 3B illustrate example isometric views of an example gear reduction system in accordance with some example embodiments described herein.

FIG. 3A illustrates an example isometric view 380A of an example gear reduction system 300 in accordance with some example embodiments described herein. In some embodiments, the gear reduction system 300 may be a dual stage, dual axes, single plane, epicyclic gear reduction system with compact anti-backlash gearing. In some embodiments, the gear reduction system 300 may comprise, or be referred to as, a gear train. In some embodiments, a maximum diameter of the gear reduction system 300 is less than about two inches.

As shown in FIG. 3A, the example gear reduction system 300 may comprise an input shaft 301 coupled to a first gear (e.g., first gear 302 shown in FIG. 3B) and a gear 303. The first gear 302 and the gear 303 may be integral to the input shaft 301. The example gear reduction system 300 may further comprise a second gear 310 configured to be disposed in mesh with the first gear coupled to the input shaft 301. In some embodiments, the second gear 310 may be a sun gear. The example gear reduction system 300 may further comprise a carrier housing 311 configured to be fixably disposed (e.g., fabricated (e.g., cast, machined, printed) as a single component; welded; affixed using an adhesive, a set of fasteners (e.g., screws, retaining pins, bolts), or both; fabricated (e.g., cast, machined, printed) as a single component; or affixed using any other suitable technique) within the second gear 310. The second gear 310 may be integral to the carrier housing 311. The example gear reduction system 300 may further comprise a third gear 312 configured to be disposed within the carrier housing 311. In some embodiments, the third gear 312 may be an planet gear, an idler gear, or both. The third gear 312 may be mounted to the carrier housing 311 using a retaining pin and one or more ball bearings. The example gear reduction system 300 may further comprise a fixed structure 318. The fixed structure 318 may be fixably disposed (e.g., affixed using a set of fasteners (e.g., screws, retaining pins, bolts), an adhesive, or both; welded; or affixed using any other suitable technique) to a frame or a support structure. The example gear reduction system 300 may further comprise a sixth gear 324 coupled to an intermediate shaft (e.g., the intermediate shaft 323 shown in FIG. 3B). The sixth gear 324 may be fixably disposed to the intermediate shaft 323. In some embodiments, the sixth gear 324 may be an output pinion gear. The example gear reduction system 300 may further comprise a ball bearing 325 coupled to the sixth gear 324 and a gear shaft (e.g., the gear shaft 320 shown in FIG. 3B). The ball bearing 325 may be a plate bearing. The example gear reduction system 300 may further comprise a seventh gear 326A coupled to a sensing device 330A by a retaining ring 328A. In some embodiments, the sensing device 330A may be a first rotary position sensing device. The example gear reduction system 300 may further comprise a seventh gear 326B coupled to a sensing device 330B by a retaining ring 328B. In some embodiments, the sensing device 330B may be a second rotary position sensing device. The sixth gear 324 may be configured to be disposed in mesh with the seventh gear 326A and the seventh gear 326B. The example gear reduction system 300 may further comprise an anti-backlash gear 327A coupled to (e.g., disposed above) the seventh gear 326A by a torsion spring and the retaining ring 328A. The example gear reduction system 300 may further comprise an anti-backlash gear 327B coupled to (e.g., disposed above) the seventh gear 326B by a torsion spring and the retaining ring 328B. The anti-backlash gear 327A and the anti-backlash gear 327B may be configured to be disposed in mesh with the sixth gear 324 to provide for compact anti-backlash gearing.

Figure 3B:
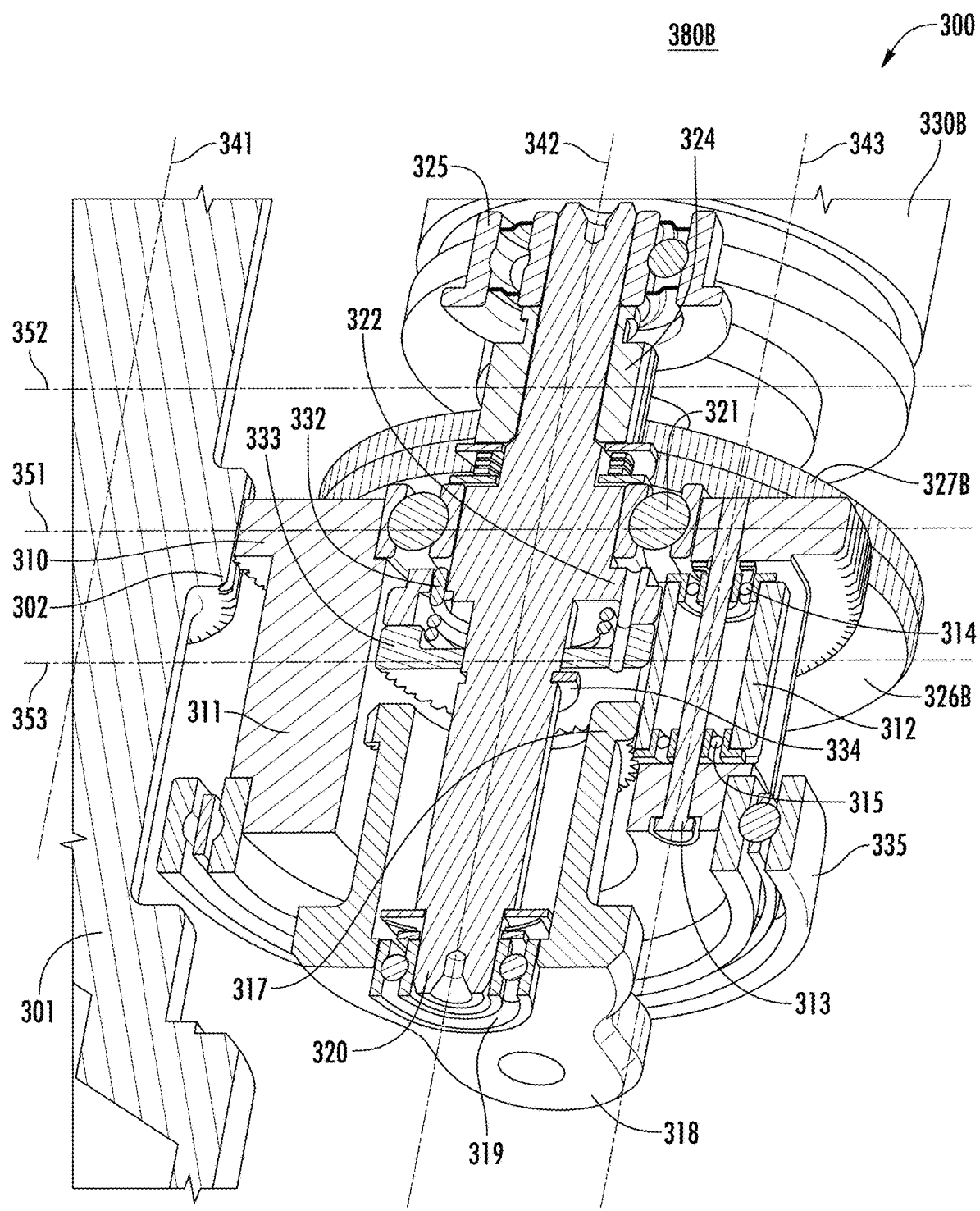

FIG. 3B illustrates an example cross-sectional isometric view 380B of the example gear reduction system 300 in accordance with some example embodiments described herein. As shown in FIG. 3B, the example gear reduction system 300 may comprise a first gear 302 coupled to the input shaft 301. In some embodiments, the first gear 302 may be an input shaft drive gear. The example gear reduction system 300 may further comprise the second gear 310 configured to be disposed in mesh with the first gear 302. The example gear reduction system 300 may further comprise the carrier housing 311 configured to be fixably disposed within the second gear 310. The example gear reduction system 300 may further comprise the third gear 312 configured to be disposed within the carrier housing 311. The third gear 312 may be mounted to the carrier housing 311 using a retaining pin 313, a ball bearing 314, and a ball bearing 315. A wave spring may preload the ball bearing 314 and may be disposed between the ball bearing 314 and the carrier housing 311. Another wave spring may preload the ball bearing 315 and may be disposed between the ball bearing 315 and the carrier housing 311. The example gear reduction system 300 may further comprise the fixed structure 318. The example gear reduction system 300 may further comprise a fourth gear 317 coupled to the fixed structure 318 and configured to be disposed in mesh with the third gear 312. The fourth gear 317 may be integral to the fixed structure 318. The third gear 312 may be further configured to rotate about the fourth gear 317. In some embodiments, the fourth gear 317 may be a stationary gear. In some embodiments, the fourth gear 317 may have one less tooth than the fifth gear 322. The example gear reduction system 300 may further comprise a gear shaft 320. The example gear reduction system 300 may further comprise a ball bearing 319 coupled to a first portion of the gear shaft 320. The ball bearing 319 may be a frame bearing. A wave spring may be disposed on the ball bearing 319 for preloading the ball bearing 319. The example gear reduction system 300 may further comprise a ball bearing 321 coupled to a second portion of the gear shaft 320. A wave spring may be disposed on the ball bearing 321 for preloading the ball bearing 321. The example gear reduction system 300 may further comprise a ball bearing 335 coupled to a portion of the carrier housing 311. The ball bearing 321 and the ball bearing 335 may support the carrier subassembly and have comparatively high load ratings. The example gear reduction system 300 may further comprise the ball bearing 325 coupled to the sixth gear 324 and a third portion of the gear shaft 320. A wave spring may be disposed on the ball bearing 325 for preloading the ball bearing 325. The example gear reduction system 300 may further comprise a fifth gear 322 coupled to the gear shaft 320 and configured to be disposed in mesh with the third gear 312. The fifth gear 322 may be integral to the gear shaft 320. In some embodiments, the fifth gear 322 may be an opposing gear of the fourth gear 317. The example gear reduction system 300 may further comprise an anti-backlash gear 333 coupled to the fifth gear 322 by an anti-backlash spring 332 and a retaining ring 334. The anti-backlash gear 333 may be configured to be disposed in mesh with the third gear 312 to provide for compact anti-backlash gearing. The example gear reduction system 300 may further comprise the sixth gear 324 coupled to the gear shaft 320. The sixth gear 324 may be coupled to the fifth gear 322 via the gear shaft 320. The example gear reduction system 300 may further comprise the seventh gear 326B coupled to the sensing device 330B by a retaining ring. The sixth gear 324 may be configured to be disposed in mesh with the seventh gear 326B. The example gear reduction system 300 may further comprise the anti-backlash gear 327B coupled the seventh gear 326B by a torsion spring and the retaining ring. The anti-backlash gear 327B may be configured to be disposed in mesh with the sixth gear 324 to provide for compact anti-backlash gearing.

In some embodiments, the gear reduction system 300 may provide for a variable center-to-center distance between the third gear 312 and the fifth gear 322. For example, the gear reduction system 300 may comprise a spring (not shown) and spring load the retaining pin 313 by mechanically coupling the spring to the retaining pin 313. In some embodiments, the gear reduction system 300 may spring load the retaining pin 313 in the absence of the anti-backlash gear 333. For example, the gear reduction system 300 may comprise the spring for spring loading the retaining pin 313 but not include the anti-backlash gear 333.

In some embodiments, the gear reduction system 300 may provide for indexing based on differences between the fourth gear 317, the fifth gear 322, and portions of the third gear 312, such as differences in pitch diameters, numbers of teeth, tooth forms, and combinations thereof. In some embodiments, the fourth gear 317 and the fifth gear 322 may have the same pitch diameter but a different number of teeth. For example, the pitch diameter of the fourth gear 317 may be the same as the pitch diameter of the fifth gear 322, but the fourth gear 317 may have one less tooth, or one more tooth, than the fifth gear 322. As a result, when the third gear 312 orbits the fourth gear 317 and the fifth gear 322, the third gear 312 forces the teeth to align wherever the third gear 312 is meshing and thereby indexes the third gear 312 one tooth per orbit. In some embodiments, the fourth gear 317 and the fifth gear 322 may have a different pitch diameter, a different tooth form (e.g., imperfect tooth form), or both. For example, the fourth gear 317 and the fifth gear 322 may have a different pitch diameter and a different tooth form (e.g., one or both of the fourth gear 317 and the fifth gear 322 may have a nonstandard tooth form). In some embodiments, the portions of the third gear 312 configured to be disposed in mesh with the fourth gear 317 and the fifth gear 322 may have different pitch diameters, different numbers of teeth, different tooth forms, or a combination thereof. For example, the third gear 312 may have an upper portion configured to be disposed in mesh with the fifth gear 322 and a lower portion configured to be disposed in mesh with the fourth gear 317. In one illustrative example, the upper portion of the third gear 312 may have the same pitch diameter but a different number of teeth than the bottom portion of the third gear 312. In another illustrative example, the upper portion of the third gear 312 may have the same number of teeth but a different pitch diameter than the bottom portion of the third gear 312. In yet another illustrative example, the upper portion of the third gear 312 may have a different number of teeth and a different pitch diameter than the bottom portion of the third gear 312.

Although the anti-backlash gear 333 is shown in FIG. 3B as being coupled to the fifth gear 322 by the anti-backlash spring 332 and the retaining ring 334 (e.g, the anti-backlash gear 333 is shown in FIG. 3B as being springloaded relative to the fifth gear 322), in other embodiments, the gear reduction system 300 rather may provide for compact anti-backlash gearing via an anti-backlash gear (e.g., an anti-backlash gear similar in pitch diameter to anti-backlash gear 333) coupled to the fourth gear 317 by an anti-backlash spring and a retaining ring (e.g., the anti-backlash gear may be springloaded relative to the fourth gear 317). In some embodiments, the anti-backlash spring may be disposed between the anti-backlash gear 333 and the ball bearing 319, such as between the anti-backlash gear 333 and an extrusion on an interior surface of the housing 318. In still other embodiments, the gear reduction system 300 rather may provide for compact anti-backlash gearing via two anti-backlash gears: the anti-backlash gear 333 coupled to the fifth gear and springloaded relative to the fifth gear 322; and an anti-backlash gear coupled to the fourth gear 317 and springloaded relative to the fourth gear 317.

In some embodiments, the gear reduction system 300 rather may provide for compact anti-backlash gearing by splitting the third gear 312 into two separate gears, an upper third gear and a lower third gear, where one gear functions as an idler gear and the other gear functions as an anti-backlash gear. For example: the anti-backlash gear 333, the anti-backlash spring 332, and the retaining ring 334 may be removed; the thickness of the fifth gear 322 may be increased (e.g., doubled); the upper third gear may be configured to be disposed in mesh with only the fifth gear 322 and function as the anti-backlash gear; and the lower third gear may be configured to be disposed in mesh with both the fourth gear 317 and the fifth gear 322 and function as the idler gear. In another example: the anti-backlash gear 333, the anti-backlash spring 332, and the retaining ring 334 may be removed; the thickness of the fourth gear 317 may be increased (e.g., doubled); the lower third gear may be configured to be disposed in mesh with only the fourth gear 317 and function as the anti-backlash gear; and the upper third gear may be configured to be disposed in mesh with both the fourth gear 317 and the fifth gear 322 and function as the idler gear.

In some embodiments, as shown in FIGS. 3A and 3B, the gear reduction system 300 may provide for dual stage gear reduction. For example, the first gear 302 and the second gear 310 may be configured to form a first gear reduction stage. The second gear 310, the third gear 312, the fourth gear 317, the fifth gear 322, the anti-backlash gear 333, and the sixth gear 324 may be configured to form a second gear reduction stage different from the first gear reduction stage. In some embodiments, the sixth gear 324, the seventh gear 326A, the seventh gear 326B, the anti-backlash gear 327A, and the anti-backlash gear 327B may be configured to form a third gear reduction stage different from the first gear reduction stage and the second gear reduction stage.

In some embodiments, as shown in FIGS. 3A and 3B, the gear reduction system 300 may provide for dual axes gear reduction. For example, the first gear 302, the input shaft 301, and the gear 303 may be configured to be disposed along a first axis of rotation 341. The second gear 310, the fourth gear 317, the fifth gear 322, the anti-backlash gear 333, and the sixth gear 324 may be configured to be disposed along a second axis of rotation 342 different from the first axis of rotation 341. In some embodiments, the third gear 312 may be configured to be disposed along a third axis of rotation 343 different from the first axis of rotation 341 and the second axis of rotation 342. In some embodiments, the seventh gear 326A, the anti-backlash gear 327A, and the sensing device 330A may be configured to be disposed along a fourth axis of rotation 344A different from the first axis of rotation 341, the second axis of rotation 342, and the third axis of rotation 343. In some embodiments, the seventh gear 326B, the anti-backlash gear 327B, and the sensing device 330B may be configured to be disposed along a fifth axis of rotation 344B different from the first axis of rotation 341, the second axis of rotation 342, the third axis of rotation 343, and the fourth axis of rotation 344A.

In some embodiments, as shown in FIG. 3B, the gear reduction system 300 may provide for single plane gear reduction. For example, the first gear 302 and the second gear 310 may be configured to be disposed along a first gear interaction plane 351. In some embodiments, the sixth gear 324, the seventh gear 326A, the seventh gear 326B, the anti-backlash gear 327A, and the anti-backlash gear 327B may be configured to be disposed along a second gear interaction plane 352 different from the first gear interaction plane 351. In some embodiments, the third gear 312, the fourth gear 317, the fifth gear 322, and the anti-backlash gear 333 may be configured to be disposed along a third gear interaction plane 353 different from the second gear interaction plane 352. In some embodiments, as shown in FIG. 3B, the third gear interaction plane 353 may be different from the first gear interaction plane 351. In other embodiments, the third gear interaction plane 353 may be the same as, or substantially similar to, the first gear interaction plane 351.

Figure 4:
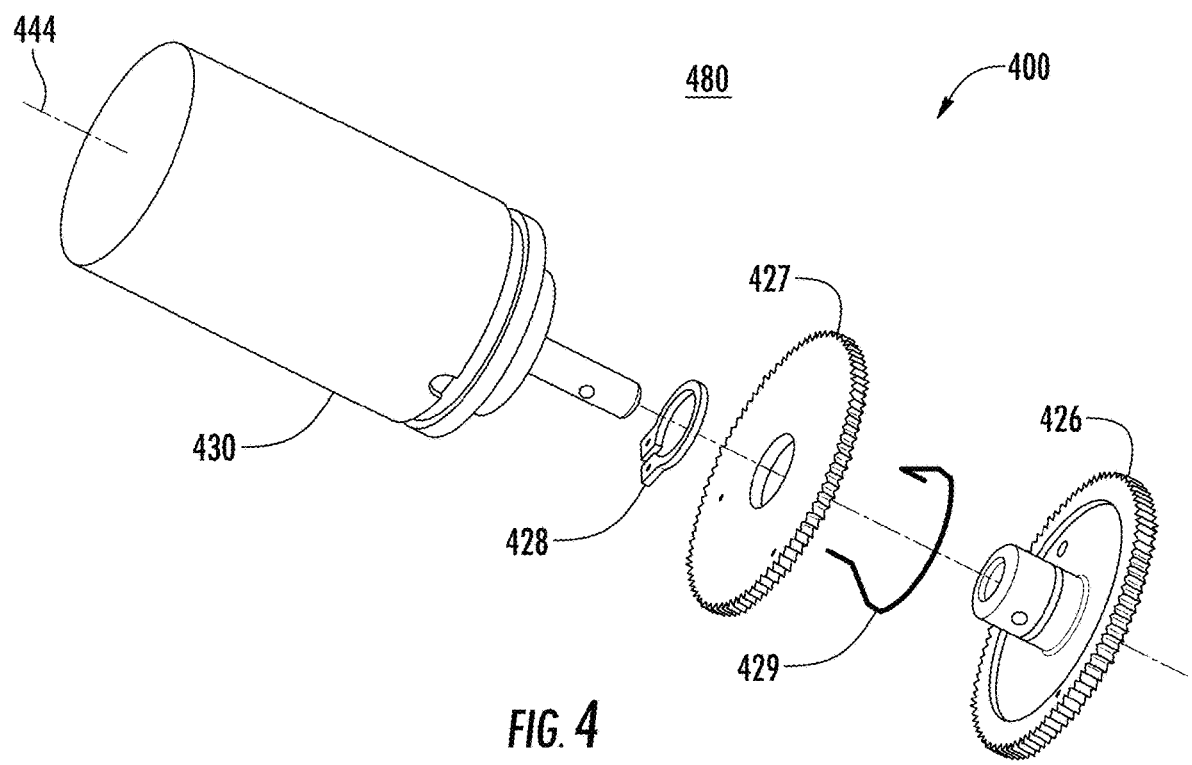
FIG. 4 illustrates an example exploded view of an example anti-backlash mechanism in accordance with some example embodiments described herein.

FIG. 4 illustrates an example exploded view 480 of an example anti-backlash mechanism 400 in accordance with some example embodiments described herein. The example anti-backlash mechanism 400 may comprise a seventh gear 426 coupled to a sensing device 430 by a retaining ring 428. The example anti-backlash mechanism 400 may further comprise an anti-backlash gear 427 coupled the seventh gear 426 by a torsion spring 429 and the retaining ring 428. In some embodiments, the torsion spring 429 instead may be a compression spring. The seventh gear 426 and the anti-backlash gear 427 may be configured to be disposed in mesh with a sixth gear (not shown) to provide for compact anti-backlash gearing. In some embodiments, the sensing device 430 may be a rotary position sensing device. In some embodiments, the seventh gear 426, the anti-backlash gear 427, and the sensing device 430 may be configured to be disposed along an axis of rotation 444.

As shown in FIG. 4, the seventh gear 426 (e.g., the driven gear) is rigidly attached to the input shaft of the sensing device 430. The anti-backlash gear 427 is torsionally spring-loaded (e.g., by the torsion spring 429) relative to the seventh gear 426. The spring load causes the anti-backlash gear 427 to rotate relative the seventh gear 426 until the drive gear (e.g., the sixth gear 124, 224, 324) tooth is pinched between the seventh gear 426 and the anti-backlash gear 427, taking up all the clearance. So long as the torque to be transmitted is less than the torque applied by the anti-backlash spring, there will be no lost motion when the direction of rotation is reversed.

In some embodiments, although the gears described with reference to FIGS. 1-4 as shown as straight cut gears, one or more of the gears described with reference to FIGS. 1-4 may be helical gears.

In some embodiments, the components described with reference to FIGS. 1-4 may comprise stainless steel, aluminum, other metals, or a combination thereof (e.g., alloys). In some embodiments, the components described with reference to FIGS. 1-4 may comprise plastic, nylon, acetyl, polycarbonate, polyphenylene sulfide, polyurethane, or a combination thereof. In some embodiments, the fixed structure (e.g., fixed structure 118, 218, 318) may comprise mounting structures (e.g., threaded holes, non-threaded holes) configured to receive and support fasteners (e.g., hexalobular countersunk head stainless steel screws, other screws, bolts, clamps, or the like) for affixing the fixed structure to the frame (e.g., frame 132).

Having described specific components and structures of example devices involved in the present disclosure, example procedures for providing a gear reduction system are described below in connection with FIG. 5.

Figure 5:
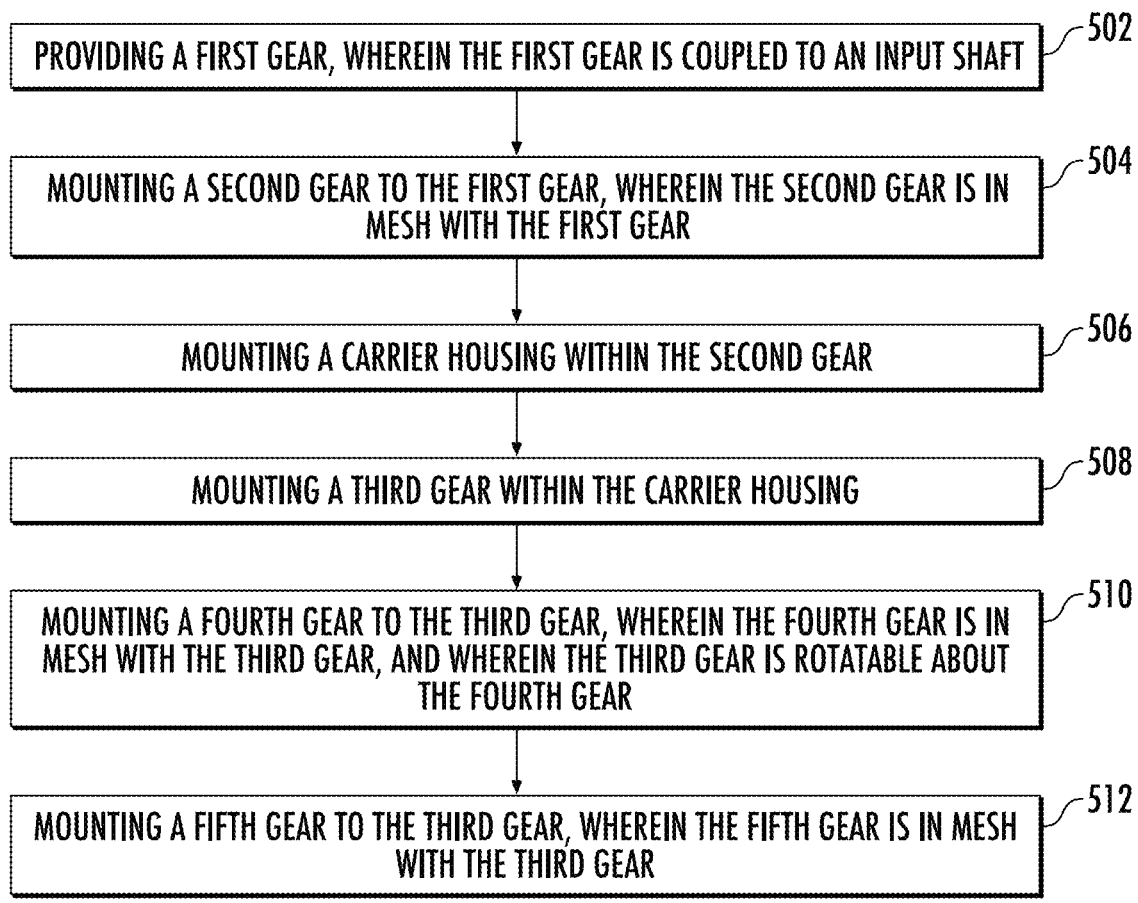
FIG. 5 illustrates an example flowchart illustrating an example method in accordance with some example embodiments described herein.

FIG. 5 illustrates an example flowchart 500 that contains example operations for providing a gear reduction system according to some example embodiments described herein. In some embodiments, the gear reduction system described with reference to FIG. 5 may be included in a dual stage, dual axes, single plane, epicyclic gear reduction system with compact anti-backlash gearing, such as gear reduction system 100, 200, or 300.

As shown by operation 502, the example flowchart 500 may begin by providing a first gear (e.g., first gear 102, 202, 302), wherein the first gear is coupled to an input shaft (e.g., input shaft 101, 201, 301). As shown by operation 504, the example flowchart 500 may proceed to mounting a second gear (e.g., second gear 110, 210, 310) to the first gear, wherein the second gear is in mesh with the first gear. As shown by operation 506, the example flowchart 500 may proceed to mounting a carrier housing (e.g., carrier housing 111, 211, 311) within the second gear. As shown by operation 508, the example flowchart 500 may proceed to mounting a third gear (e.g., third gear 112, 212, 312) within the carrier housing. As shown by operation 510, the example flowchart 500 may proceed to mounting a fourth gear (e.g., fourth gear 117, 217, 317) to the third gear, wherein the fourth gear is in mesh with the third gear, and wherein the third gear is rotatable about the fourth gear. As shown by operation 512, the example flowchart 500 may proceed to mounting a fifth gear (e.g., fifth gear 122, 222, 322) to the third gear, wherein the fifth gear is in mesh with the third gear. The second gear, the fourth gear, the anti-backlash gear, and the fifth gear may be disposed along a common axis of rotation (e.g., second axis of rotation 142, 242, 342). The first gear, the second gear, the third gear, the fourth gear, the anti-backlash gear, and the fifth gear may be disposed along a common gear interaction plane (e.g., first gear interaction plane 151, 251, 351).

Optionally (not shown in FIG. 5 for the sake of brevity), the example flowchart 500 may proceed to mounting a sixth gear (e.g., sixth gear 124, 224, 324) to the fifth gear, wherein the sixth gear is coupled to the fifth gear. Optionally, the example flowchart 500 may proceed to mounting a seventh gear (e.g., seventh gear 126, 226A, 226B, 326A, 326B, 426) to the sixth gear, wherein the seventh gear is in mesh with the sixth gear, and wherein the seventh gear is coupled to a sensing device (e.g., sensing device 130, 230A, 230B, 330A, 330B, 430). Optionally, the example flowchart 500 may proceed to mounting an anti-backlash gear (e.g., anti-backlash gear 127A, 127B, 227A, 227B, 327A, 327B, 427) to the seventh gear, wherein the anti-backlash gear is coupled to the seventh gear, and wherein the anti-backlash gear is in mesh with the sixth gear to provide for compact anti-backlash gearing. Optionally, the example flowchart 500 may proceed to mounting an anti-backlash gear (e.g., anti-backlash gear 333) to the fifth gear (e.g., fifth gear 322), wherein the anti-backlash gear is in mesh with the third gear (e.g., third gear 312) to provide for compact anti-backlash gearing.

In some embodiments, operations 502, 504, 506, 508, 510, and 512 may not necessarily occur in the order depicted in FIG. 5. In some embodiments, one or more of the operations depicted in FIG. 5 may occur substantially simultaneously. In some embodiments, one or more additional operations may be involved before, after, or between any of the operations shown in FIG. 5.

As described above, FIG. 5 illustrates an example flowchart describing operations performed in accordance with example embodiments of the present disclosure. It will be understood that each block of the flowchart, and combinations of blocks in the flowchart, may be implemented by various means, such as devices comprising hardware, firmware, one or more processors, circuitry associated with execution of software comprising one or more computer program instructions, or a combination thereof. For example, one or more of the procedures described above may be performed by material handling equipment (e.g., one or more robotic arms, servo motors, motion controllers, other material handling equipment and structures, and combinations thereof) and computer program instructions residing on a non-transitory computer-readable storage memory. In this regard, the computer program instructions which embody the procedures described above may be stored by a memory of an apparatus employing an embodiment of the present disclosure and executed by a processor of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. When executed, the instructions stored in the computer-readable storage memory produce an article of manufacture configured to implement the various functions specified in flowchart blocks. Moreover, execution of a computer or other processing circuitry to perform various functions converts the computer or other processing circuitry into a particular machine configured to perform an example embodiment of the present disclosure.

Accordingly, the described flowchart blocks support combinations of means for performing the specified functions and combinations of operations for performing the specified functions. It will also be understood that one or more flowchart blocks, and combinations of flowchart blocks, can be implemented by special purpose hardware-based computer systems which perform the specified functions, or combinations of special purpose hardware that execute computer instructions.

In some example embodiments, certain operations disclosed herein may be modified or further amplified as described below. Moreover, in some embodiments additional optional operations may also be included. It should be appreciated that each of the modifications, optional additions or amplifications described herein may be included with the operations disclosed herein either alone or in combination with any other operations described herein, such as the features and structures described with reference to FIGS. 1-4 and 6-7.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," and similar words are not intended to limit the order of the steps; these words are simply used to guide the reader through the description of the methods. Further, any reference to claim elements in the singular, for example, using the articles "a," "an" or "the," is not to be construed as limiting the element to the singular and may, in some instances, be construed in the plural.

Figure 6:
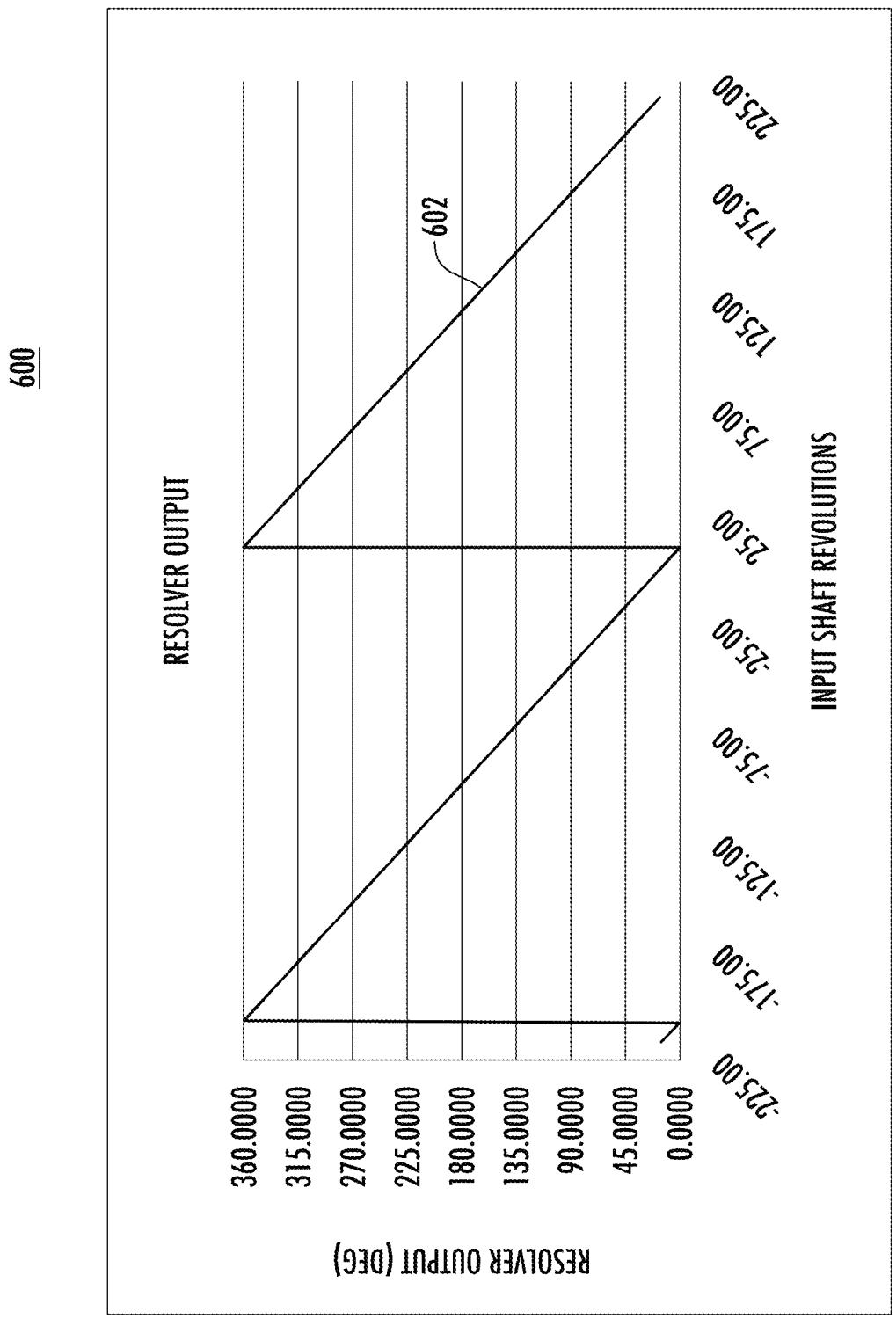
FIG. 6 illustrates example resolver sensing element measurements in accordance with some example embodiments described herein.

FIG. 6 illustrates example resolver sensing element measurements 600 comprising a sensing element output curve 602 in accordance with some example embodiments described herein. As shown in FIG. 6, the resolver sensing element provides two outputs, sine and cosine, which are resolved to an angle output in degrees. The actual sensor output shown in FIG. 6 provides a 216.86:1 gear reduction between the input shaft and the resolver sensing element, providing 360 degrees of resolver output for every 216.86 resolutions of input shaft.

Figure 7A:
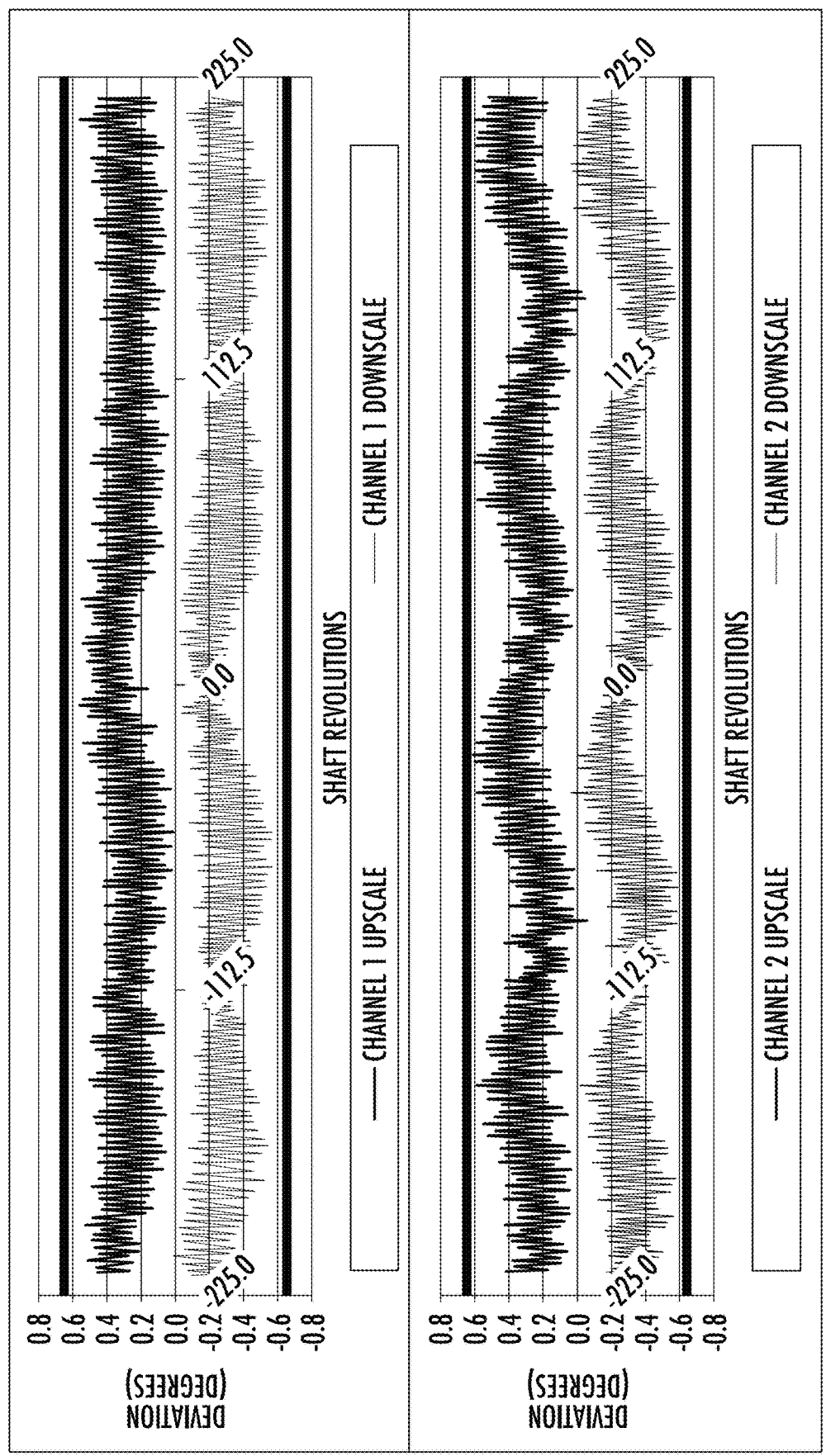
FIGS. 7A and 7B illustrate example error measurements in accordance with some example embodiments described herein.
Figure 7B:
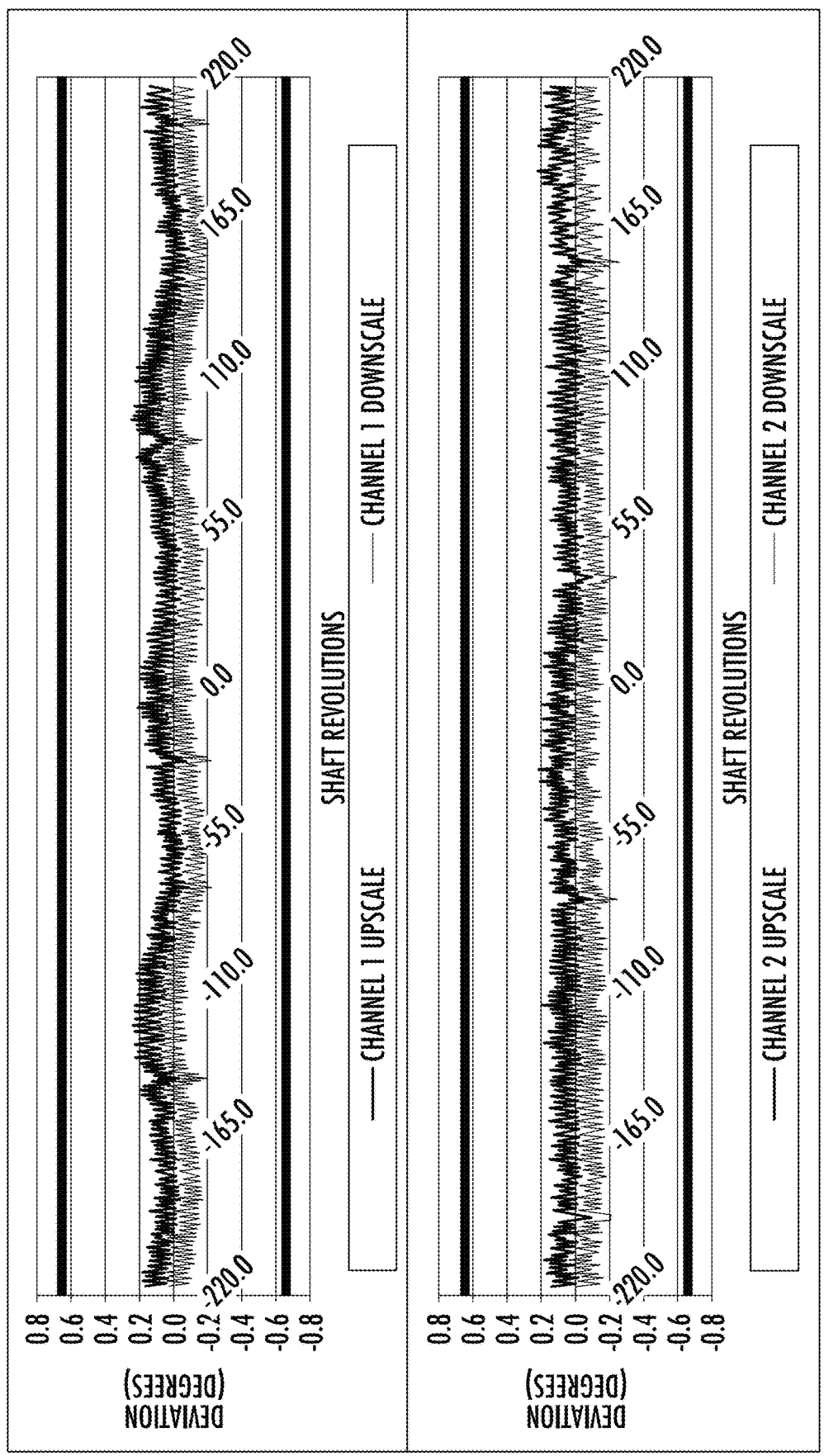

FIGS. 7A and 7B illustrate example error measurements without and with an anti-backlash mechanism on the epicyclic gear stage, respectively. FIG. 7A illustrates example error measurements 700 without an anti-backlash mechanism on the epicyclic gear stage, similar to the gear reduction system 200 shown in FIG. 2. FIG. 7B illustrates example error measurements 720 with an anti-backlash mechanism (e.g., including anti-backlash gear 333 and related components) on the epicyclic gear stage, similar to the gear reduction system 300 shown in FIG. 3. As shown by FIGS. 7A and 7B, the anti-backlash mechanism on the epicyclic gear stage greatly reduces error and hysteresis in the sensing element output.

As described above and with reference to FIGS. 1-7, example embodiments of the present disclosure thus provide for a compact gear reduction system. Thus, the gear reduction system disclosed herein may easily and cost-effectively meet all of the gearing requirements and also minimize the overall dimensions of the gear reduction system.

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the components and structures disclosed herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

The invention claimed is:

1. A system for gear reduction, the system comprising:
a second gear configured to be disposed in mesh with a first gear coupled to an input shaft;
a carrier housing configured to be fixably disposed within the second gear;
a third gear configured to be disposed within the carrier housing;
a fourth gear configured to be disposed in mesh with the third gear, wherein the third gear is further configured to rotate about the fourth gear;
an anti-backlash gear coupled to the fourth gear and configured to be disposed in mesh with the third gear; and
a fifth gear configured to be disposed in mesh with the third gear,
wherein the second gear, the fourth gear, the anti-backlash gear, and the fifth gear are configured to be disposed along a common axis of rotation, and
wherein the second gear, the third gear, the fourth gear, the anti-backlash gear, and the fifth gear are configured to be disposed along a common gear interaction plane.

2. The system of claim 1, wherein the first gear is an input shaft drive gear.

3. The system of claim 1, wherein the second gear is a sun gear.

4. The system of claim 1, wherein the third gear is an planet gear.

5. The system of claim 1, wherein the fourth gear is a stationary gear.

6. The system of claim 1, wherein the fifth gear is an opposing gear of the fourth gear.

7. The system of claim 1, wherein the system further comprises the first gear.

8. The system of claim 1, wherein the system further comprises a sixth gear coupled to the fifth gear and configured to be disposed in mesh with a seventh gear coupled to a sensing device.

9. The system of claim 8, wherein the sensing device is a rotary position sensing device.

10. The system of claim 8, wherein the system further comprises the seventh gear.

11. The system of claim 10, wherein the anti-backlash gear is a first anti-backlash gear, and wherein the system further comprises a second anti-backlash gear coupled to the seventh gear and configured to be disposed in mesh with the sixth gear.

12. The system of claim 10, wherein the common gear interaction plane is a first gear interaction plane, and wherein the sixth gear and the seventh gear are configured to be disposed along a second gear interaction plane different from the first gear interaction plane.

13. The system of claim 1, wherein the first gear and the second gear are configured to form a first gear reduction stage.

14. The system of claim 13, wherein the second gear, the third gear, the fourth gear, and the fifth gear are configured to form a second gear reduction stage different from the first gear reduction stage.

15. The system of claim 1, wherein the first gear is configured to be disposed along a first axis of rotation, and wherein the common axis of rotation is a second axis of rotation different from the first axis of rotation.

16. The system of claim 15, wherein the third gear is configured to be disposed along a third axis of rotation different from the first axis of rotation and the second axis of rotation.

17. An apparatus for gear reduction, the apparatus comprising:
a second gear configured to be disposed in mesh with a first gear coupled to an input shaft;
a carrier housing configured to be fixably disposed within the second gear;
a third gear configured to be disposed within the carrier housing;
a fourth gear configured to be disposed in mesh with the third gear, wherein the third gear is further configured to rotate about the fourth gear;
an anti-backlash gear coupled to the fourth gear and configured to be disposed in mesh with the third gear; and
a fifth gear configured to be disposed in mesh with the third gear,
wherein the second gear, the fourth gear, the anti-backlash gear, and the fifth gear are configured to be disposed along a common axis of rotation,
wherein the second gear, the third gear, the fourth gear, the anti-backlash gear, and the fifth gear are configured to be disposed along a common gear interaction plane.

18. A method for manufacturing an apparatus for gear reduction, the method comprising:
providing a first gear, wherein the first gear is coupled to an input shaft;
mounting a second gear to the first gear, wherein the second gear is in mesh with the first gear;
mounting a carrier housing within the second gear;
mounting a third gear within the carrier housing;
mounting a fourth gear to the third gear, wherein the fourth gear is in mesh with the third gear, and wherein the third gear is rotatable about the fourth gear;
mounting an anti-backlash gear to the third gear, wherein the anti-backlash gear is coupled to the fourth gear and in mesh with the third gear; and
mounting a fifth gear to the third gear, wherein the fifth gear is in mesh with the third gear,
wherein the second gear, the fourth gear, the anti-backlash gear, and the fifth gear are disposed along a common axis of rotation, and
wherein the first gear, the second gear, the third gear, the fourth gear, the anti-backlash gear, and the fifth gear are disposed along a common gear interaction plane.

19. The method of claim 18, wherein the anti-backlash gear is a first anti-backlash gear, and wherein the method further comprises:
mounting a sixth gear to the fifth gear, wherein the sixth gear is coupled to the fifth gear;
mounting a seventh gear to the sixth gear, wherein the seventh gear is in mesh with the sixth gear, and wherein the seventh gear is coupled to a sensing device; and
mounting a second anti-backlash gear to the seventh gear, wherein the second anti-backlash gear is coupled to the seventh gear, and wherein the second anti-backlash gear is in mesh with the sixth gear.

20. An apparatus manufactured according to the method of claim 18.

* * * * *